US009855949B2

(12) United States Patent
Tomatsu et al.

(10) Patent No.: US 9,855,949 B2
(45) Date of Patent: Jan. 2, 2018

(54) VEHICLE SPEED LIMITER SYSTEM

(71) Applicant: TOYOTA JIDOSHA KABUSHIKI KAISHA, Toyota-shi, Aichi-ken (JP)

(72) Inventors: Nobuyuki Tomatsu, Toyota (JP); Takashi Inoue, Kasugai (JP); Sokfan Yee, Toyota (JP); Tetsuya Taira, Nisshin (JP); Keiji Yamashita, Seto (JP); Takato Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/089,986

(22) Filed: Apr. 4, 2016

(65) Prior Publication Data

US 2016/0347312 A1 Dec. 1, 2016

(30) Foreign Application Priority Data

May 26, 2015 (JP) ................................. 2015-106826

(51) Int. Cl.
*B60T 7/12* (2006.01)
*B60W 30/14* (2006.01)
*B60W 50/14* (2012.01)

(52) U.S. Cl.
CPC .......... *B60W 30/146* (2013.01); *B60W 50/14* (2013.01); *B60W 2050/146* (2013.01);
(Continued)

(58) Field of Classification Search
CPC ........... B60W 30/146; B60W 2550/30; B60W 30/16; B60W 2720/106; B60W 2550/143; B60K 31/0008; B60T 7/22
(Continued)

(56) References Cited

U.S. PATENT DOCUMENTS 6,721,634 B1 *  4/2004  Hauler .................. B60K 35/00
                                                       340/441
6,947,064 B1 *  9/2005  Hahn ................... G08G 1/0962
                                                       345/427
(Continued)

FOREIGN PATENT DOCUMENTS

JP      S62-066235 U      4/1987
JP      2001-225673 A     8/2001
(Continued)

OTHER PUBLICATIONS

Aug. 8, 2017 Office Action issued in Japanese Patent Application No. 2015-106826.

*Primary Examiner* — Shardul Patel
(74) *Attorney, Agent, or Firm* — Oliff PLC

(57) ABSTRACT

A vehicle speed limiter system installed on a vehicle includes a detection unit to detect a speed limit value of a road while the vehicle is traveling; a setting unit to set the speed limit value; a limiter unit to limit the vehicle speed, based on the speed limit value; an obtainment unit to obtain a stepping amount on an accelerator pedal; a calculation unit to calculate a parameter depending on the stepping amount in a state where the vehicle speed is being limited by the limiter unit; and a display unit to display information based on the parameter, in a case where a speed limit value newly detected by the detection unit is greater than the speed limit value previously set by the setting unit, before the setting unit sets the speed limit value newly detected.

3 Claims, 23 Drawing Sheets

(52) U.S. Cl.
CPC ..... *B60W 2540/10* (2013.01); *B60W 2550/22* (2013.01); *B60W 2550/30* (2013.01); *B60W 2720/10* (2013.01)

(58) Field of Classification Search
USPC ........... 701/96, 103; 340/441, 905; 345/427
See application file for complete search history.

(56) References Cited

U.S. PATENT DOCUMENTS

| | | | | |
|---|---|---|---|---|
| 2004/0101166 A1* | 5/2004 | Williams | ............... | G08G 1/054 382/104 |
| 2005/0232469 A1* | 10/2005 | Schofield | ........... | G06K 9/00818 382/104 |
| 2009/0251304 A1* | 10/2009 | Saito | ..................... | F02B 77/084 340/441 |
| 2011/0176002 A1* | 7/2011 | Bury | ....................... | B60R 1/005 348/148 |
| 2012/0253628 A1 | 10/2012 | Maruyama | | |
| 2013/0085655 A1* | 4/2013 | Kii | ......................... | B60K 31/18 701/103 |
| 2015/0302747 A1* | 10/2015 | Ro | ....................... | G08G 1/0967 340/905 |

FOREIGN PATENT DOCUMENTS

| | | |
|---|---|---|
| JP | 2005-128790 A | 5/2005 |
| JP | 2006-168593 A | 6/2006 |
| JP | 2008-105559 A | 5/2008 |
| JP | 2009-184454 A | 8/2009 |
| JP | 2012-206594 A | 10/2012 |

* cited by examiner

FIG.4

| CALCULATION TARGET | RELEVANT PARAMETER | RELEVANT PARAMETER DERIVATION METHOD | | INFORMATION OBTAINMENT METHOD |
|---|---|---|---|---|
| REACTION FORCE ON DRIVE SYSTEM | VEHICLE WEIGHT | | | MEASUREMENT BY WEIGHT SENSOR |
| | | ESTIMATION BASED ON SUBDUCTION AMOUNT OF VEHICLE | | MEASUREMENT BY VEHICLE HEIGHT SENSOR |
| | | | | ANALYSIS OF IMAGE INFORMATION |
| AIR RESISTANCE FORCE | VEHICLE SHAPE | | | STORED IN ADVANCE IN ECU FOR SETTING SPEED LIMIT |
| | WIND SPEED | POSITIONAL INFORMATION | | OBTAINED FROM NAVIGATION INFORMATION |
| | | WEATHER INFORMATION | | OBTAINED FROM NETWORK COMMUNICATION INFORMATION |
| | | | | MEASUREMENT BY WIND SPEED SENSOR |
| | AIR DENSITY | ATMOSPHERIC TEMPERATURE INFORMATION | POSITIONAL INFORMATION | OBTAINED FROM NAVIGATION INFORMATION |
| | | | WEATHER INFORMATION | OBTAINED FROM NETWORK COMMUNICATION INFORMATION |
| | | | | MEASUREMENT BY ATMOSPHERIC TEMPERATURE SENSOR |
| | | ATMOSPHERIC PRESSURE INFORMATION | POSITIONAL INFORMATION | OBTAINED FROM NAVIGATION INFORMATION |
| | | | WEATHER INFORMATION | OBTAINED FROM NETWORK COMMUNICATION INFORMATION |
| | | | | MEASUREMENT BY ATMOSPHERIC PRESSURE SENSOR |
| GRAVITY | VEHICLE WEIGHT | | | MEASUREMENT BY WEIGHT SENSOR |
| | | ESTIMATION BASED ON SUBDUCTION AMOUNT OF VEHICLE | | MEASUREMENT BY VEHICLE HEIGHT SENSOR |
| | | | | ANALYSIS OF IMAGE INFORMATION |
| | ROAD SURFACE SLOPE | | | MEASUREMENT BY SLOPE SENSOR |
| | | | | ANALYSIS OF IMAGE INFORMATION |
| | | POSITIONAL INFORMATION | | OBTAINED FROM NAVIGATION INFORMATION |
| | | MAP INFORMATION | | |
| FRICTIONAL FORCE ON ROAD SURFACE | RAIN INFORMATION | | | MEASUREMENT BY RAINDROP SENSOR |
| | | POSITIONAL INFORMATION | | OBTAINED FROM NAVIGATION INFORMATION |
| | | WEATHER INFORMATION | | OBTAINED FROM NETWORK COMMUNICATION INFORMATION |
| | TIRE ABRASION INFORMATION | TRAVELLED DISTANCE | | OBTAINED FROM OTHER ECU INFORMATION |

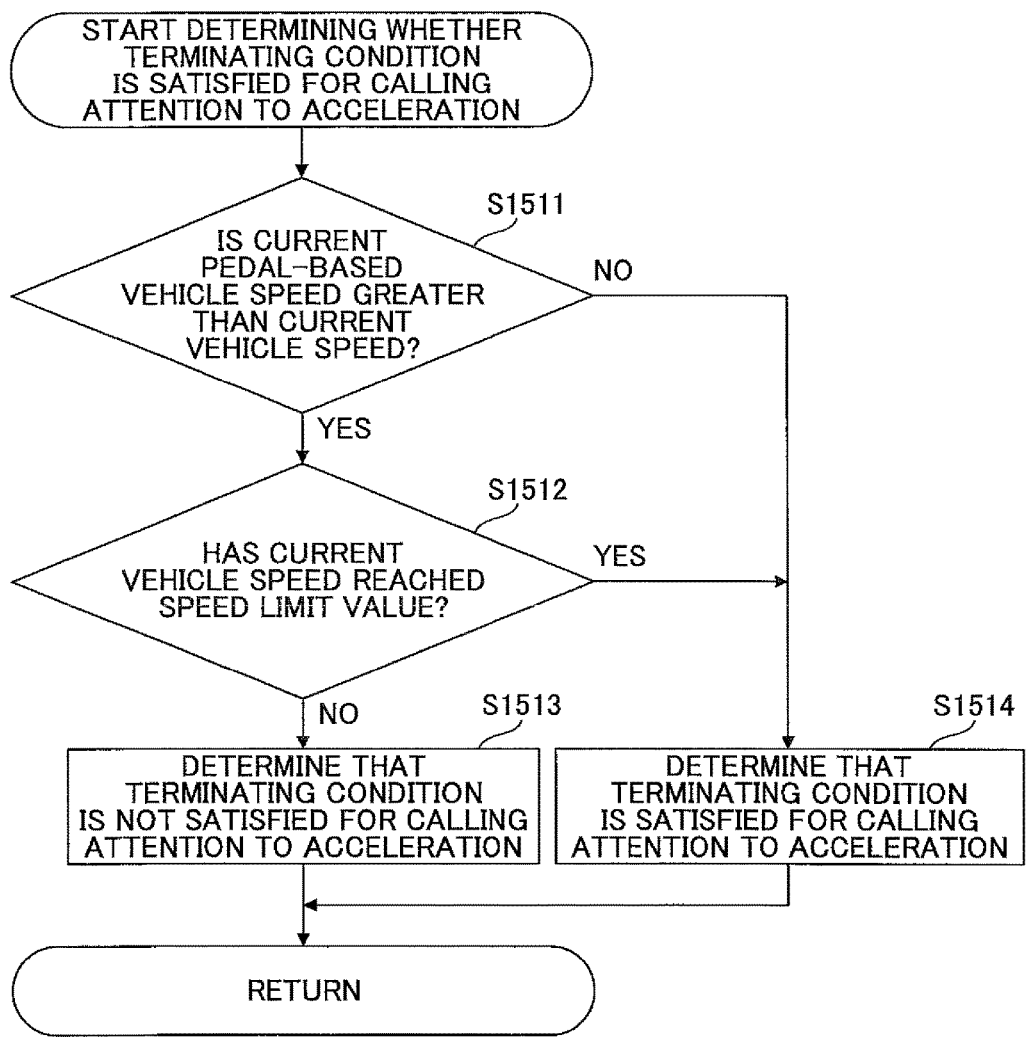

VEHICLE SPEED LIMITER SYSTEM

FIELD

The following disclosure generally relates to a vehicle speed limiter system.

BACKGROUND

Conventionally, a vehicle speed limiter system has been known that detects a speed limit value specified on a road for traveling, based on road signs and the like, and sets the detected speed limit value on the vehicle to limit the vehicle speed. According to such a vehicle speed limiter system, even if the driver steps on the accelerator pedal to go over the set speed limit value, the vehicle speed remains below the set speed limit value, and traveling safety can be maintained.

RELATED-ART DOCUMENTS

Patent Documents

[Patent Document 1] Japanese Laid-open Patent Publication No. 2006-168593

On the other hand, in a state where the vehicle speed is being limited, in general, the driver may not pay sufficient attention to the stepping amount on the accelerator pedal. Therefore, for example, while the vehicle speed is being limited, if a speed limit value is newly detected to make the speed limit switch to a higher value, and the stepping amount on the accelerator pedal by the driver happens to be large, the switching of the speed limit may result in unexpected acceleration of the vehicle. Moreover, if there is a preceding vehicle, the likelihood increases for the vehicle to collide with the preceding vehicle.

In view of the above, if switching to a new speed limit value increases the speed limit value of the vehicle while the vehicle speed is being limited, it is desirable to make the driver conscious of the stepping amount on the accelerator pedal before the switching, and if the stepping amount on the accelerator pedal is large, to make the driver recognize it. This is because if the driver knows in advance that the switching may accelerate the vehicle, and/or likelihood may increase for the vehicle to collide with the preceding vehicle, the driver may be able to adjust the stepping amount on the accelerator pedal before the switching.

Thereupon, it is an object of the disclosure to provide a vehicle speed limiter system that makes a driver recognize the stepping amount on the accelerator pedal before switching to a new speed limit value in case that the switching increases the speed limit of the vehicle while the vehicle speed is being limited.

SUMMARY

According to an aspect of the disclosure, a vehicle speed limiter system, installed on a vehicle, includes a detection unit configured to detect a speed limit value of a road on which the vehicle is traveling; a setting unit configured to set the speed limit value detected by the detection unit; a limiter unit configured to limit the vehicle speed of the vehicle, based on the speed limit value set by the setting unit; an obtainment unit configured to obtain a stepping amount on an accelerator pedal of the vehicle; a calculation unit configured to calculate a parameter depending on the stepping amount, by using the stepping amount obtained by the obtainment unit in a state where the vehicle speed of the vehicle is being limited by the limiter unit; and a display unit configured to display information based on the parameter calculated by the calculation unit, in a case where a speed limit value newly detected by the detection unit is greater than the speed limit value previously set by the setting unit, before the setting unit sets the speed limit value newly detected.

In this way, the vehicle speed limiter system obtains the stepping amount on the accelerator pedal in a state where the vehicle speed of the vehicle is being limited, and calculates a parameter depending on the obtained stepping amount. Therefore, according to the vehicle speed limiter system, the parameter depending on the stepping amount can be obtained while the vehicle speed is being limited.

Also, if a speed limit value greater than the set speed limit value is newly detected, the vehicle speed limiter system displays information based on the parameter depending on the stepping amount on the accelerator pedal before setting the newly detected speed limit value. Therefore, the driver can take a look at the information displayed based on the parameter depending on the stepping amount on the accelerator pedal, before the speed limit value is increased by switching to the newly detected speed limit value. Consequently, the driver can recognize the stepping amount on the accelerator pedal before the switching of the speed limit value.

According to an aspect of the disclosure, it is possible for the driver to recognize the stepping amount on the accelerator pedal before switching to a new speed limit value in case that the switching increases the speed limit of the vehicle while the vehicle speed is being limited.

BRIEF DESCRIPTION OF DRAWINGS

FIG. 4 is a diagram that illustrates an example of relevant parameters used when calculating the pedal-based vehicle speed based on the stepping amount on the accelerator pedal;

FIGS. 15A-15B are flowcharts that illustrate flows of a process to determine whether the condition for calling attention to acceleration is satisfied, and a process to determine whether the terminating condition for calling attention to acceleration is satisfied, respectively;

DESCRIPTION OF EMBODIMENTS

In the following, embodiments will be described with reference to the drawings. Note that in the specification and the drawings, elements that have substantially the same functions and configurations are assigned the same codes, and duplicated description will be omitted.

[First Embodiment]

<1. Configuration of Setting Control System>

Figure 1:
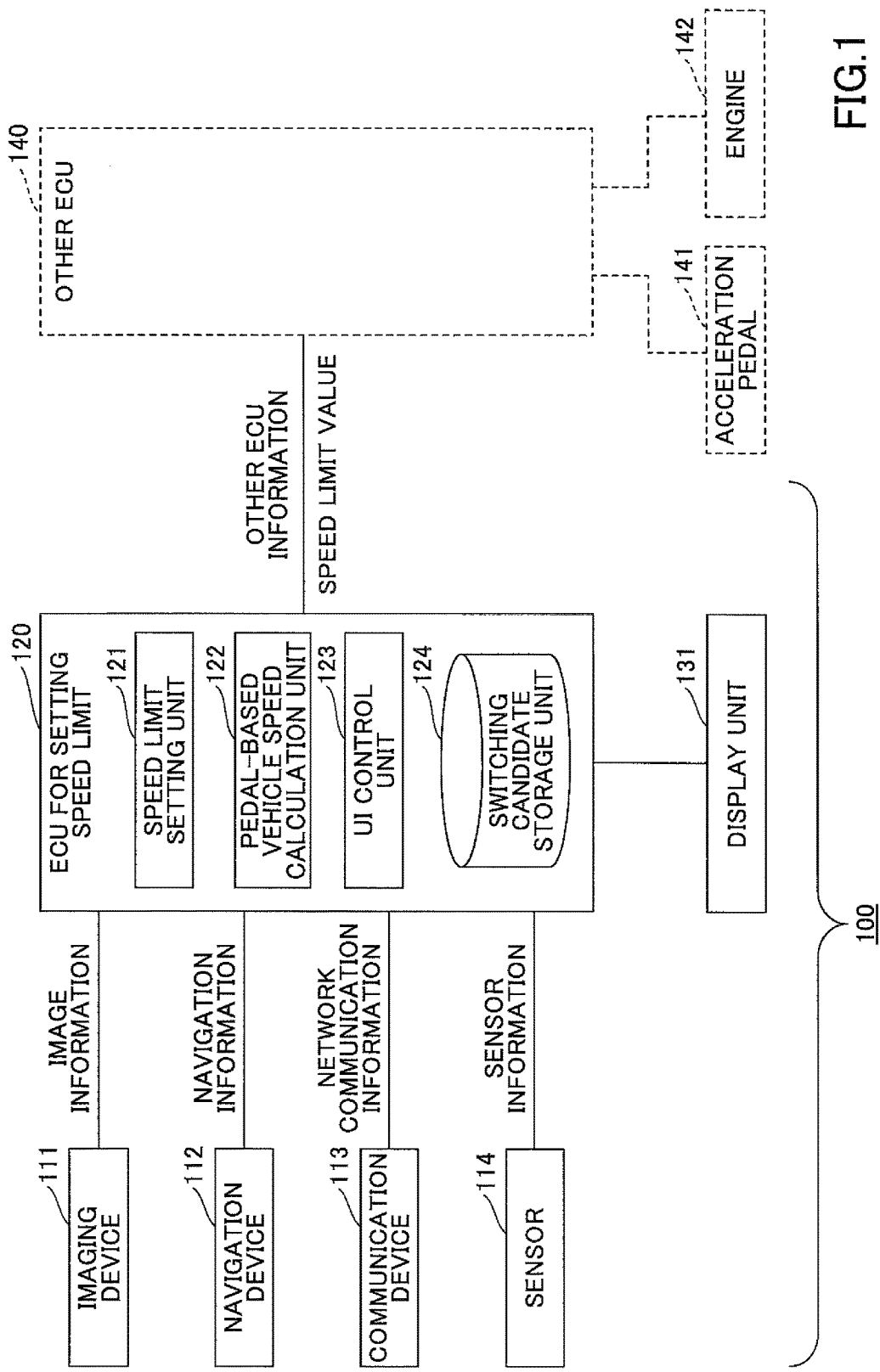
FIG. 1 is a diagram that illustrates an example of a setting control system.

First, a configuration of a setting control system will be described that is a system to set a speed limit value in a vehicle control system controlling the vehicle speed based on the speed limit value. FIG. 1 is a diagram that illustrates an example of such a setting control system. As illustrated in FIG. 1, a setting control system 100 includes an imaging device 111, a navigation device 112, a communication device 113, and sensors 114. The setting control system 100 also includes an ECU (Electronic Control Unit) for setting speed limit 120 as an example of a control device, and a display unit 131. Note that the setting control system 100 in the present embodiment constitutes a vehicle speed limiter system that has the setting control system 100 connected with another ECU 140 connected with an acceleration pedal 141, an engine 142, and the like.

The imaging device 111 captures an image of a road sign on a road for traveling (road) while the vehicle is traveling, and transmits the captured image information to the ECU for setting the speed limit 120 every predetermined frame cycle. The navigation device 112 identifies the position of the vehicle while traveling, and transmits positional information representing the identified position and map information including the identified position to the ECU for setting the speed limit 120, as navigation information.

The communication device 113 is connected with a network such as the Internet to obtain weather information including weather, atmospheric pressure, and air temperature at the position of the vehicle while traveling, and transmits the obtained information to the ECU for setting the speed limit 120, as network communication information.

The sensors 114 include multiple sensors installed in the vehicle, to measure various physical quantities, respectively. The sensors 114 includes, for example, a vehicle height sensor to measure the vehicle height, a wind speed sensor to measure the wind speed around the vehicle, an air temperature sensor to measure the air temperature around the vehicle, and an atmospheric pressure sensor to measure the atmospheric pressure around the vehicle. The sensors 114 also include a weight sensor to measure the weight of the vehicle, an inclination sensor to measure the inclination of the vehicle, and a raindrop sensor to measure raindrops. Note that the physical quantities measured by the respective sensors included in the sensors 114 are transmitted to the ECU for setting the speed limit 120, as sensor information.

The ECU for setting the speed limit 120 has a speed limit setting program, a pedal-based vehicle speed calculation program, a UI control program, and the like installed. The ECU for setting the speed limit 120 functions as a speed limit setting unit 121, a pedal-based vehicle speed calculation unit 122, and a UI control unit 123, by executing the respective programs.

The speed limit setting unit 121 detects a speed limit value specified on a road sign, based on image information transmitted from the imaging device 111, and sets the detected speed limit value as the upper limit speed value on the other ECU 140. The speed limit setting unit 121 temporarily stores the detected speed limit value in the switching candidate storage unit 124 as a candidate to be used for switching the upper limit speed value, until the detected speed limit value is eventually set on the other ECU 140 as the upper limit speed value. Note that a candidate to be used for switching the upper limit speed value will be referred to as a "candidate of the speed limit value to be switched", in the following.

The pedal-based vehicle speed calculation unit 122 obtains a stepping amount on the acceleration pedal 141 by the driver, from the other ECU 140. The pedal-based vehicle speed calculation unit 122 calculates a vehicle speed estimated from an obtained stepping amount on the acceleration pedal 141 (referred to as a "pedal-based vehicle speed" below). The pedal-based vehicle speed calculated by the estimation is a parameter that directly corresponds to the stepping amount on the acceleration pedal 141, namely, corresponds to the vehicle speed that would be obtained assuming that the vehicle speed is not limited by the other ECU 140 even though the vehicle speed is being limited actually. Note that the pedal-based vehicle speed calculation unit 122 uses the image information, the navigation information, the network communication information, the sensor information, and the like, to calculate the pedal-based vehicle speed.

The UI control unit 123 displays the current vehicle speed included in other ECU information received from the other ECU 140 (referred to as the "current vehicle speed" below), and the pedal-based vehicle speed calculated by the pedal-based vehicle speed calculation unit 122 on the display unit 131. This makes it possible for the driver to recognize the parameter (the pedal-based vehicle speed) that corresponds to the stepping amount on the acceleration pedal 141 by himself/herself.

The display unit 131 displays the current vehicle speed and the pedal-based vehicle speed output by the ECU for setting the speed limit 120 on a speed display screen.

The other ECU 140 controls, for example, the rotational speed of the engine 142 and the like to limit the vehicle speed, based on the speed limit value set by the ECU for setting the speed limit 120 as the upper limit speed value, the stepping amount on the acceleration pedal 141, and the like. Also, in addition to limiting the vehicle speed, the other ECU 140 transmits the other ECU information that includes the current vehicle speed, the stepping amount on the acceleration pedal 141 of the vehicle, and the accumulated value of the travel distance of the vehicle, to the ECU for setting the speed limit 120.

Note that the example in FIG. 1 is configured to have the imaging device 111, the navigation device 112, the communication device 113, and the sensors 114 connected with the ECU for setting the speed limit 120, to input various information items from these devices into the ECU for setting the speed limit 120. However, these devices may be connected with the other ECU 140 to input various information items from these devices into the ECU for setting the speed limit 120 via the other ECU 140.

Also, in the example in FIG. 1, the ECU for setting the speed limit 120 is provided as an ECU separate from the other ECU 140. However, functions implemented by the ECU for setting the speed limit 120 may be implemented, for example, on the other ECU 140, so that the ECU for setting the speed limit 120 is integrated with the other ECU 140.

<2. Hardware Configuration of ECU for Setting the Speed Limit>

Figure 2:
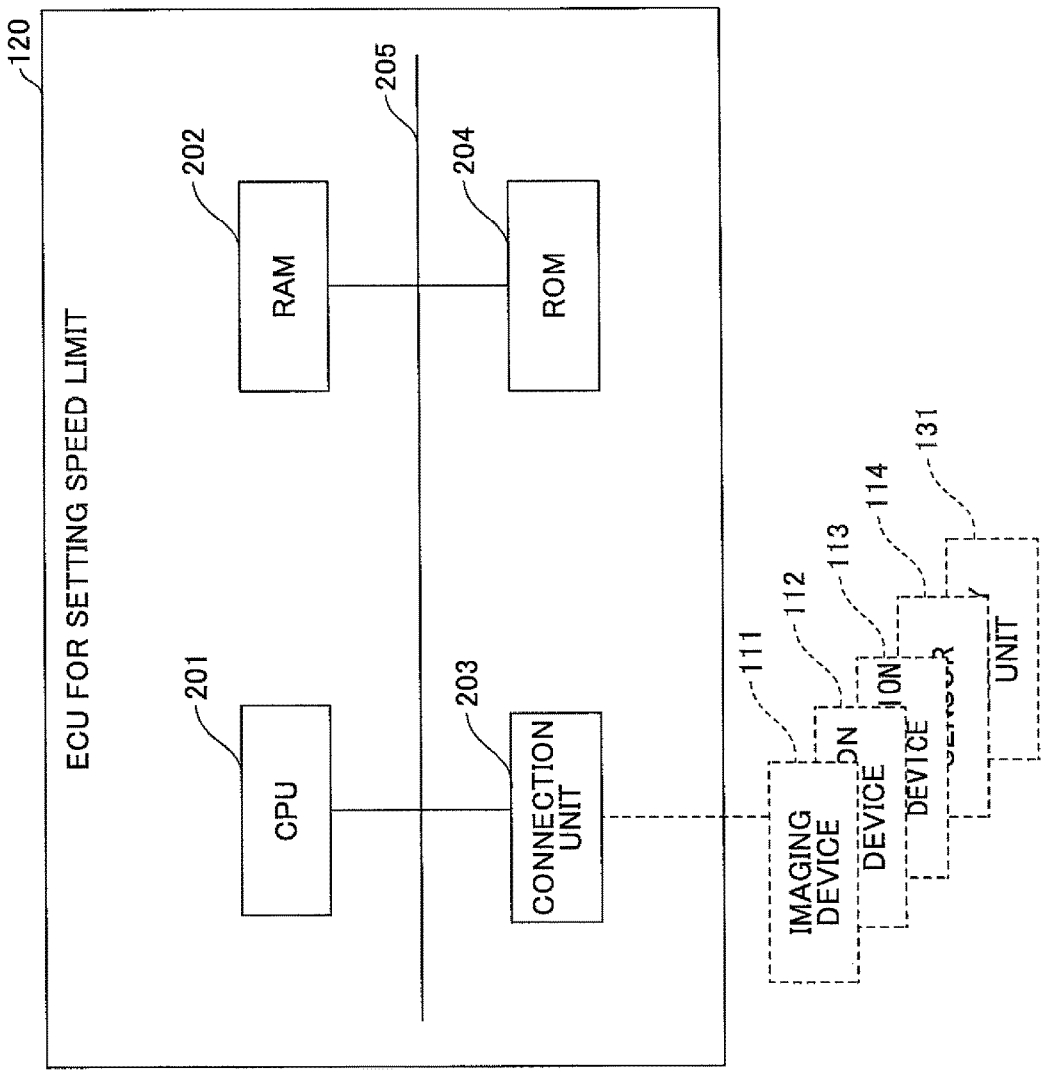
FIG. 2 is a diagram that illustrates an example of a hardware configuration of an ECU for setting the speed limit.

Next, a hardware configuration of the ECU for setting the speed limit 120, will be described. FIG. 2 is a diagram that illustrates an example of a hardware configuration of the ECU for setting the speed limit 120.

As illustrated in FIG. 2, the ECU for setting the speed limit 120 includes a CPU (Central Processing Unit) 201, a RAM (Random Access Memory) 202, a connection unit 203, and a ROM (Read-Only Memory) 204. Note that these units of the ECU for setting the speed limit 120 are mutually connected via a bus 205.

The CPU 201 is a computer that executes programs (the speed limit setting program, the pedal-based vehicle speed calculation program, the UI control program, etc.) stored in the ROM 204.

The RAM 202 is a main memory unit such as a DRAM (Dynamic Random Access Memory) and a SRAM (Static Random Access Memory). The RAM 202 functions as a work area in which a program stored in the ROM 204 is loaded and executed by the CPU 201. The RAM 202 also functions as a storage area in which information is temporarily stored that is generated by a program stored in the ROM 204, and executed by the CPU 201 (for example, a candidate of the speed limit value to be switched).

The connection unit 203 is connected with and various devices such as the imaging device 111 and the navigation device 112, and serves as an interface to transmit/receive various information items to/from the various devices.

The ROM 204 is a main memory unit such as an EPROM and an EEPROM, and stores the programs (the speed limit setting program, the pedal-based vehicle speed calculation program, the UI control program, etc.) executed by the CPU 201, and information that is used when the programs are executed.

<3. Functional Configuration of ECU for Setting the Speed Limit>

Next, among functional units implemented by the ECU for setting the speed limit 120, the pedal-based vehicle speed calculation unit 122 and the UI control unit 123 will be further described in detail.

<3.1 Functions of Pedal-based Vehicle Speed Calculation Unit>

Figure 3:
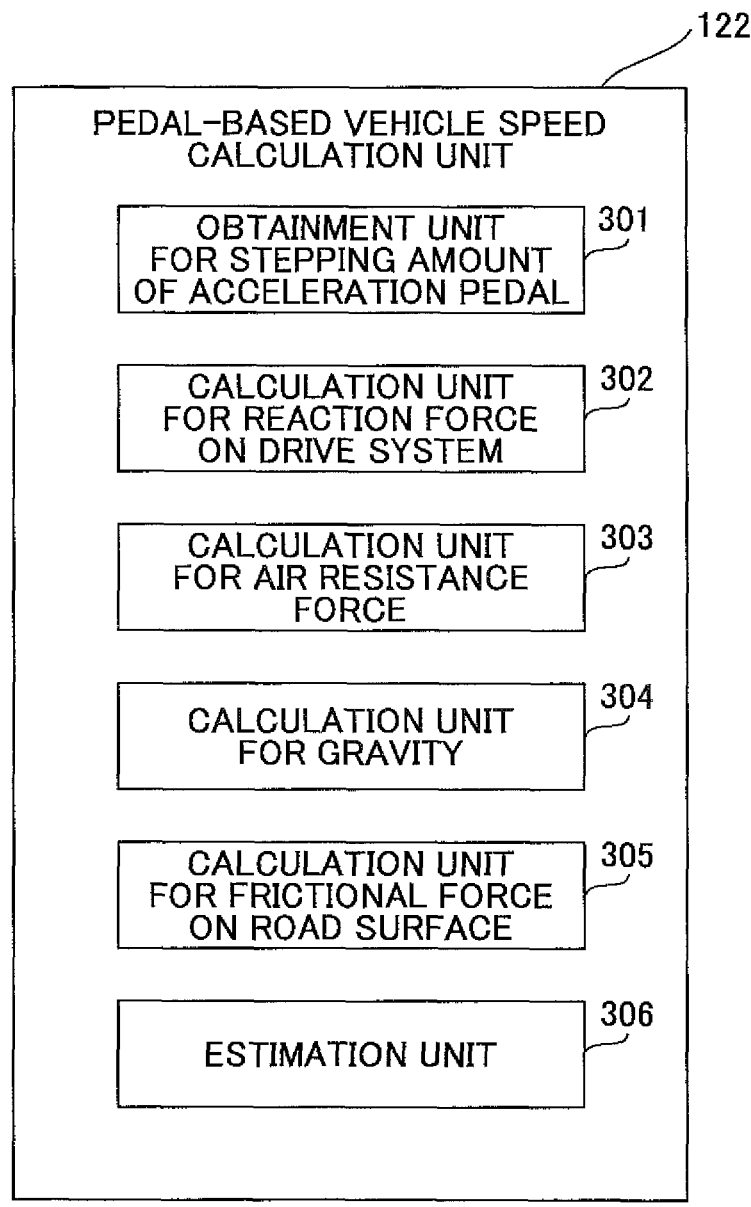
FIG. 3 is a diagram that illustrates an example of a functional configuration of a pedal-based vehicle speed calculation unit.

First, functions of the pedal-based vehicle speed calculation unit 122 will be described in detail. FIG. 3 is a diagram that illustrates an example of a functional configuration of the pedal-based vehicle speed calculation unit 122. As illustrated in FIG. 3, the pedal-based vehicle speed calculation unit 122 includes an obtainment unit for the stepping amount on the acceleration pedal 301, a calculation unit for the reaction force on the drive system 302, a calculation unit for the air resistance force 303, a calculation unit for the gravity 304, a calculation unit for the frictional force on the road surface 305, and an estimation unit 306.

The obtainment unit for the stepping amount on the acceleration pedal 301 obtains a stepping amount on the acceleration pedal 141 by the driver from the other ECU 140. Note that the vehicle travels by a driving force generated by the driver stepping on the acceleration pedal 141 (driving force depending on the stepping amount), and the vehicle speed while traveling is determined by a balance between the driving force and forces reacting against the driving force.

The forces reacting against the driving force includes, for example, reaction force on the drive system, air resistance force, gravity, and frictional force on the road surface. The pedal-based vehicle speed calculation unit 122 calculates these forces to calculate the pedal-based vehicle speed. Note that relevant parameters used for calculating the reaction force on the drive system, the air resistance force, the gravity, the frictional force on the road surface, and the like are as illustrated in FIG. 4. In the following, with reference to FIG. 4, functions will be described for the calculation unit for the reaction force on the drive system 302, the calculation unit for the air resistance force 303, the calculation unit for the gravity 304, and the calculation unit for the frictional force on the road surface 305.

The calculation unit for the reaction force on the drive system 302 calculates the reaction force on the drive system generated on the drive system of the vehicle. The reaction force on the drive system of the vehicle can be represented by a function of the vehicle weight, and can be calculated by obtaining the vehicle weight. As illustrated in FIG. 4, as the vehicle weight, for example, a measurement result measured by a weight sensor may be used. Alternatively, a subduction amount of the vehicle body may be calculated based on a measurement result measured by a vehicle height sensor, to estimate the vehicle weight based on the calculated subduction amount. Note that the subduction amount of the vehicle body may be calculated by analyzing image information captured by the imaging device 111, instead of a measurement result by the vehicle height sensor.

The calculation unit for the air resistance force 303 calculates the air resistance force against the vehicle. The air resistance force can be represented by a function of the vehicle shape, the wind speed, and the air density, and can be calculated by obtaining the vehicle shape, the wind speed, and the air density. As illustrated in FIG. 4, the vehicle shape is assumed to be stored in advance in the speed limit setting unit 121 of the ECU for setting the speed limit 120. Also, the wind speed can be derived based on, for example, positional information of vehicle, and weather information based on the positional information of the vehicle. Alternatively, a measurement result measured by a wind speed sensor may be used.

Note that positional information of the vehicle can be obtained from navigation information transmitted from the navigation device 112, and weather information can be obtained from network communication information transmitted from the communication device 113.

Also, the air density can be calculated based on air temperature information and atmospheric pressure information. The air temperature information can be derived based on, for example, the positional information of the vehicle and weather information based on the positional information of the vehicle. Alternatively, a measurement result measured by an air temperature sensor may be used.

Also, the atmospheric pressure information can be derived based on, for example, the positional information of the vehicle and weather information based on the positional information of the vehicle. Alternatively, a measurement result measured by an atmospheric pressure sensor may be used.

The calculation unit for the gravity 304 calculates gravity acting on the vehicle. The gravity can be represented by a function of the vehicle weight and the road surface gradient, and can be calculated by obtaining the vehicle weight and the road surface gradient. As illustrated in FIG. 4, as the vehicle weight, for example, a measurement result measured by a weight sensor may be used. Alternatively, a subduction amount of the vehicle body may be calculated based on a measurement result measured by a vehicle height sensor, to estimate the vehicle weight based on the calculated subduction amount. Note that the subduction amount of the vehicle body may be calculated by analyzing image information captured by the imaging device 111, instead of a measurement result by the vehicle height sensor.

Also, as the road surface gradient, for example, a measurement result measured by a gradient sensor may be used. Alternatively, it may be calculated by analyzing image information transmitted from the imaging device 111. Alternatively, it may be derived based on the positional information of the vehicle and weather information based on the positional information of the vehicle. Note that the positional information of the vehicle and map information can be obtained from navigation information transmitted from the navigation device 112.

The calculation unit for the frictional force on the road surface 305 calculates the friction force that acts on the vehicle whose tires are in contact with the road surface. The frictional force on the road surface can be represented by a function of rain information and tire abrasion information, and can be calculated by obtaining the rain information and the tire abrasion information. As illustrated in FIG. 4, as rain information, for example, a measurement result measured by a raindrop sensor may be used. Alternatively, it may be derived based on the positional information of the vehicle and weather information based on the positional information of the vehicle.

Also, the tire abrasion information can be estimated based on, for example, the accumulated value of the travel distance of the vehicle. Note that the accumulated value of the travel distance of the vehicle can be obtained from the other ECU information transmitted from the other ECU 140.

The estimation unit 306 calculates the pedal-based vehicle speed, based on the driving force depending on the stepping amount obtained by the obtainment unit for the stepping amount on the acceleration pedal 301, the reaction force on the drive system, the air resistance force, the gravity, and the frictional force on the road surface that are calculated as the forces reacting against the driving force.

<3.2 Functions of UI Control Unit>

Figure 5:
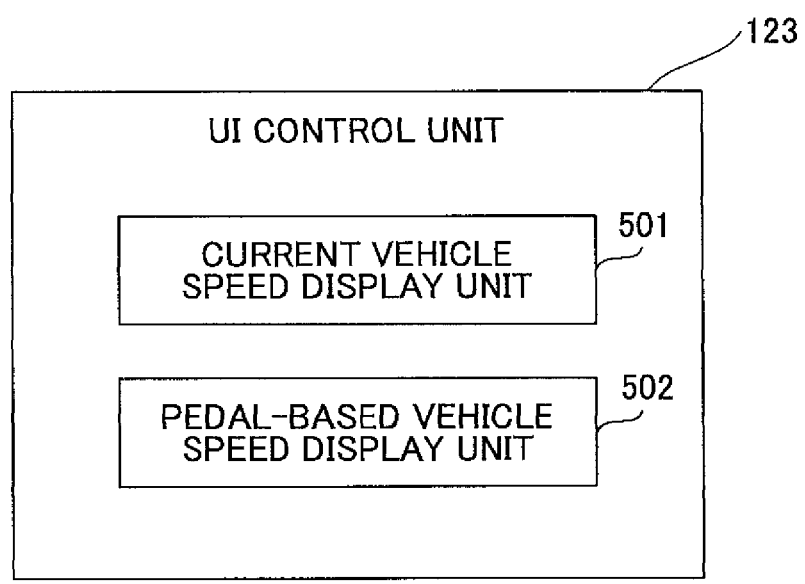
FIG. 5 is a diagram that illustrates an example of a functional configuration of a UI control unit.

Next, functions of the UI control unit 123 will be described. FIG. 5 is a diagram that illustrates a functional configuration of the UI control unit 123. As illustrated in FIG. 5, the UI control unit 123 includes a current vehicle speed display unit 501, and a pedal-based vehicle speed display unit 502.

The current vehicle speed display unit 501 extracts a current vehicle speed of the vehicle from the other ECU information transmitted from the other ECU 140, and displays the extracted current vehicle speed on a speed display screen of the display unit 131.

The pedal-based vehicle speed display unit 502 displays a pedal-based vehicle speed calculated by the estimation unit 306 of the pedal-based vehicle speed calculation unit 122, on a speed display screen of the display unit 131.

<4. Display Examples of Speed Display Screens>

Figure 6A:
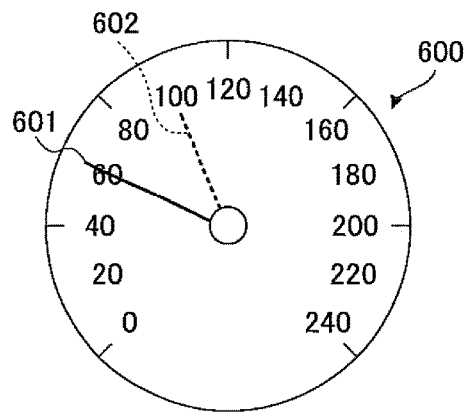
FIGS. 6A-6C are diagrams that illustrate display examples of speed display screens.
Figure 6B:
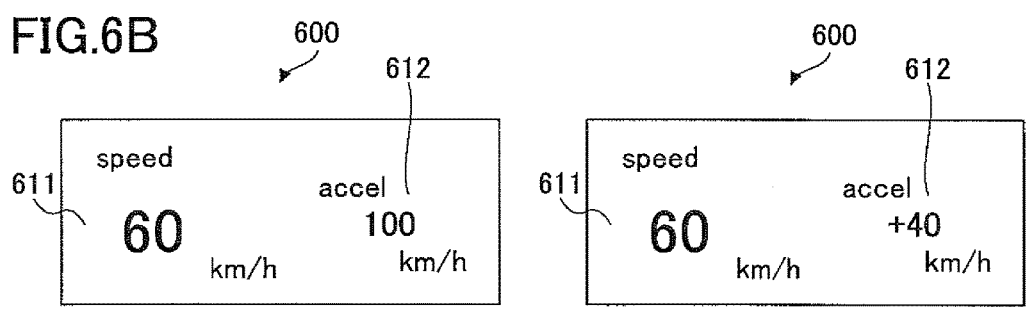
Figure 6C:
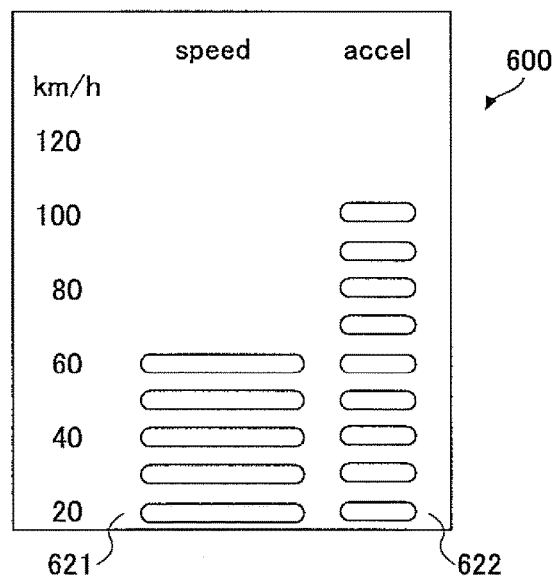

Next, speed display screens displayed on the display unit 131 by the UI control unit 123 will be described. FIGS. 6A-6C are diagrams that illustrate display examples of speed display screens. Among these, FIG. 6A illustrates a speed display screen 600 that displays the current vehicle speed and the pedal-based vehicle speed by indicator hands 601 and 602, respectively, with respect to speed values arrayed around a dial.

In FIG. 6A, the indicator hand 601 indicates the current vehicle speed. Also, the indicator hand 602 indicates the pedal-based vehicle speed. Note that in the example in FIG. 6A, the pedal-based vehicle speed is "100 km/h", whereas the current vehicle speed is "60 km/h". This is because "60 km/h" is set as the upper limit speed value, and the current vehicle speed is limited to be less than or equal to "60 km/h".

FIG. 6B illustrates speed display screens 600 that digitally display the current vehicle speed and the pedal-based vehicle speed. In an example in FIG. 6B, the current vehicle speed display area 611 shows "60 km/h" as the current vehicle speed, and the pedal-based vehicle speed display area 612 shows "100 km/h" as the pedal-based vehicle speed.

Note that the pedal-based vehicle speed shown in the pedal-based vehicle speed display area may be the difference from the current vehicle speed. The right side of FIG. 6B illustrates a case where the difference from the current vehicle speed is shown as the pedal-based vehicle speed in the pedal-based vehicle speed display area 612. The current vehicle speed of "60 km/h" and the pedal-based vehicle speed of "100 km/h" result in the difference of "+40 km/h".

FIG. 6C illustrates another speed display screen 600 that shows the current vehicle speed and the pedal-based vehicle speed by bar graphs 621 and 622, respectively, with respect to speed values arrayed linearly. In FIG. 6C, the bar graph 621 indicates the current vehicle speed. Also, the bar graph 622 indicates the pedal-based vehicle speed.

<5. Display Examples of Speed Display Screen in Traveling Scenes>

Figure 7:
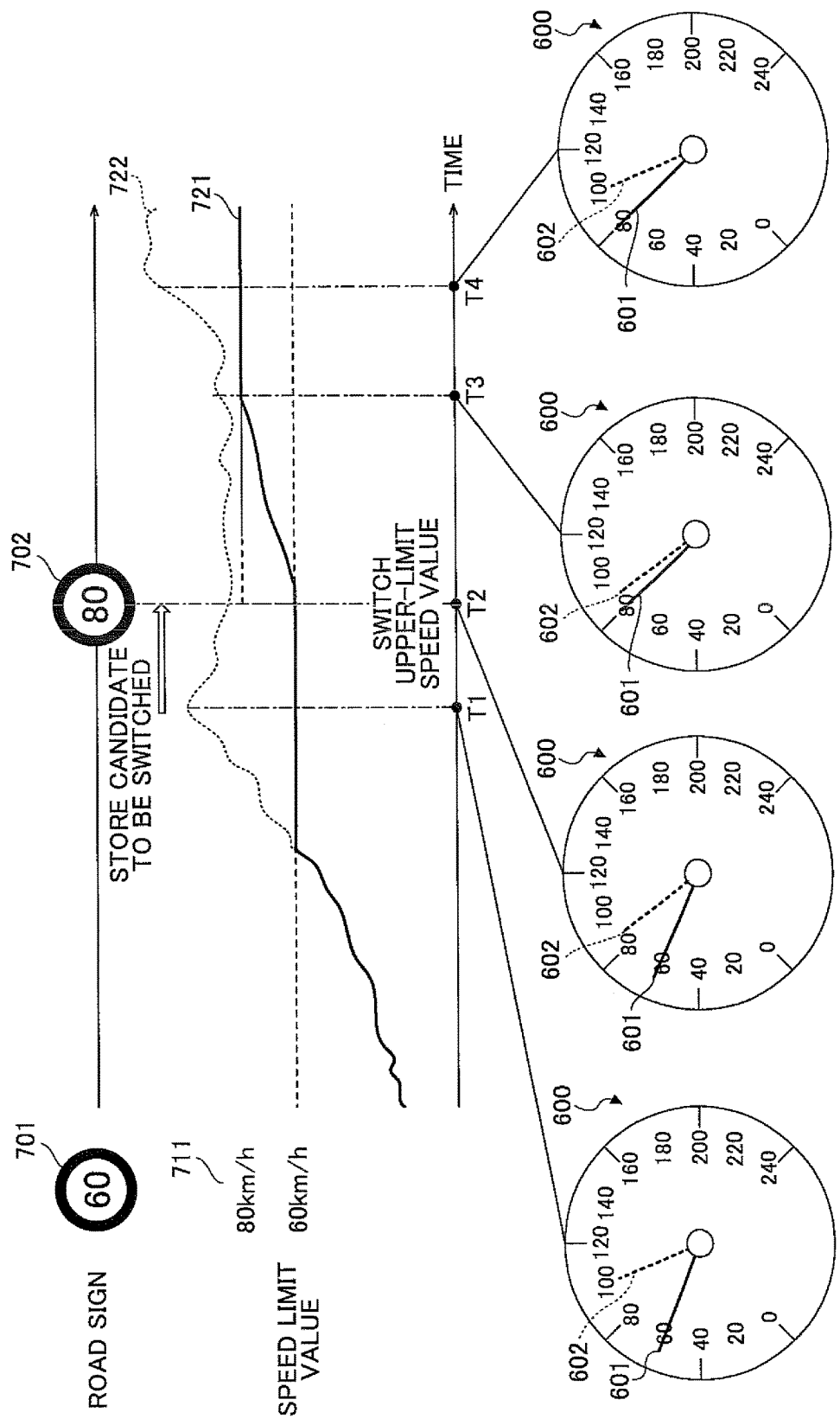
FIG. 7 is a diagram that illustrates display examples of a speed display screen in traveling scenes.

Next, display examples of a speed display screen in traveling scenes will be described. FIG. 7 is a diagram that illustrates display examples of one of the speed display screens 600 in traveling scenes.

Specifically, the figure illustrates display examples of the speed display screen 600 in traveling scenes in a case where travelling has been started in state where a speed limit value 711 of "60 km/h" has been detected based on a road sign 701, and an upper limit speed value of "60 km/h" has been set in the other ECU 140.

As illustrated in FIG. 7, when the current vehicle speed is less than the upper limit speed value of "60 km/h", the current vehicle speed 721 is equivalent to the pedal-based vehicle speed 722. In other words, when the current vehicle speed is less than the upper limit speed value of "60 km/h", the current vehicle speed 721 changes following the stepping amount on the acceleration pedal 141 by the driver.

On the other hand, once the current vehicle speed reaches the upper limit speed value of "60 km/h", the current vehicle speed 721 remains unchanged at the upper limit speed value of "60 km/h" irrespective of the pedal-based vehicle speed 722. Therefore, the current vehicle speed of "60 km/h" is displayed, and the pedal-based vehicle speed of "100 km/h" is displayed on the speed display screen 600, for example, at time T1.

Note that in the example in FIG. 7, at time T1, another speed limit value is detected based on a road sign 702, and "80 km/h" is stored as a candidate of the speed limit value to be switched. Then, when the vehicle passes by the position where the road sign 702 is installed, the candidate of the speed limit value to be switched is transmitted to the other ECU 140, to be set in the other ECU 140, and the upper limit speed value is switched.

Once the upper limit speed value is switched, the vehicle speed may be increased depending on the stepping amount on the acceleration pedal 141. In this case, since the pedal-based vehicle speed has been already displayed on the speed display screen 600, the driver can recognize the stepping amount on the acceleration pedal 141 by himself/herself on the speed display screen 600 before the vehicle passes by the position where the road sign 702 is installed. Thus, the driver can adjust the stepping amount on the acceleration pedal 141.

Specifically, if the driver judges that behavior of the vehicle may change (the vehicle accelerates steeply) by the switching of the upper limit speed value because the pedal-based vehicle speed is high, the driver can decrease in advance the stepping amount on the acceleration pedal 141, to avoid steep acceleration of the vehicle and to maintain safe traveling. Note that the driver can confirm that he/she has decreased the stepping amount on the acceleration pedal 141 by the decreased pedal-based vehicle speed. A speed display screen 600 at time T2 illustrates a state when the stepping amount on the acceleration pedal 141 is decreased. After the switching of the upper limit speed value, the current vehicle speed 721 increases gradually.

After the switching of the upper limit speed value, the current vehicle speed 721 increases gradually, and reaches "80 km/h". which is the upper limit speed value after the switching. After that, the current vehicle speed 721 remains unchanged at the upper limit speed value of "80 km/h" irrespective of the pedal-based vehicle speed 722. Therefore, the current vehicle speed of "80 km/h" is displayed, and the pedal-based vehicle speed of "87 km/h" is displayed on the speed display screen 600, for example, at time T3. Similarly, the current vehicle speed of "80 km/h" is displayed, and the pedal-based vehicle speed of "110 km/h" is displayed on the speed display screen 600, for example, at time T4.

In this way, in the embodiment, even in a state where the vehicle speed is being limited to be less than or equal to the speed limit value due to the vehicle speed limit based on the speed limit value, the pedal-based vehicle speed is displayed on the speed display screen 600 for scenes. Therefore, even in a state where the vehicle speed is being limited to be less than the speed limit value, the driver can recognize the stepping amount on the acceleration pedal 141 by himself/herself, and can adjust the stepping amount if necessary.

<6. Flow of Process to Display the Pedal-Based Vehicle Speed>

Figure 8:
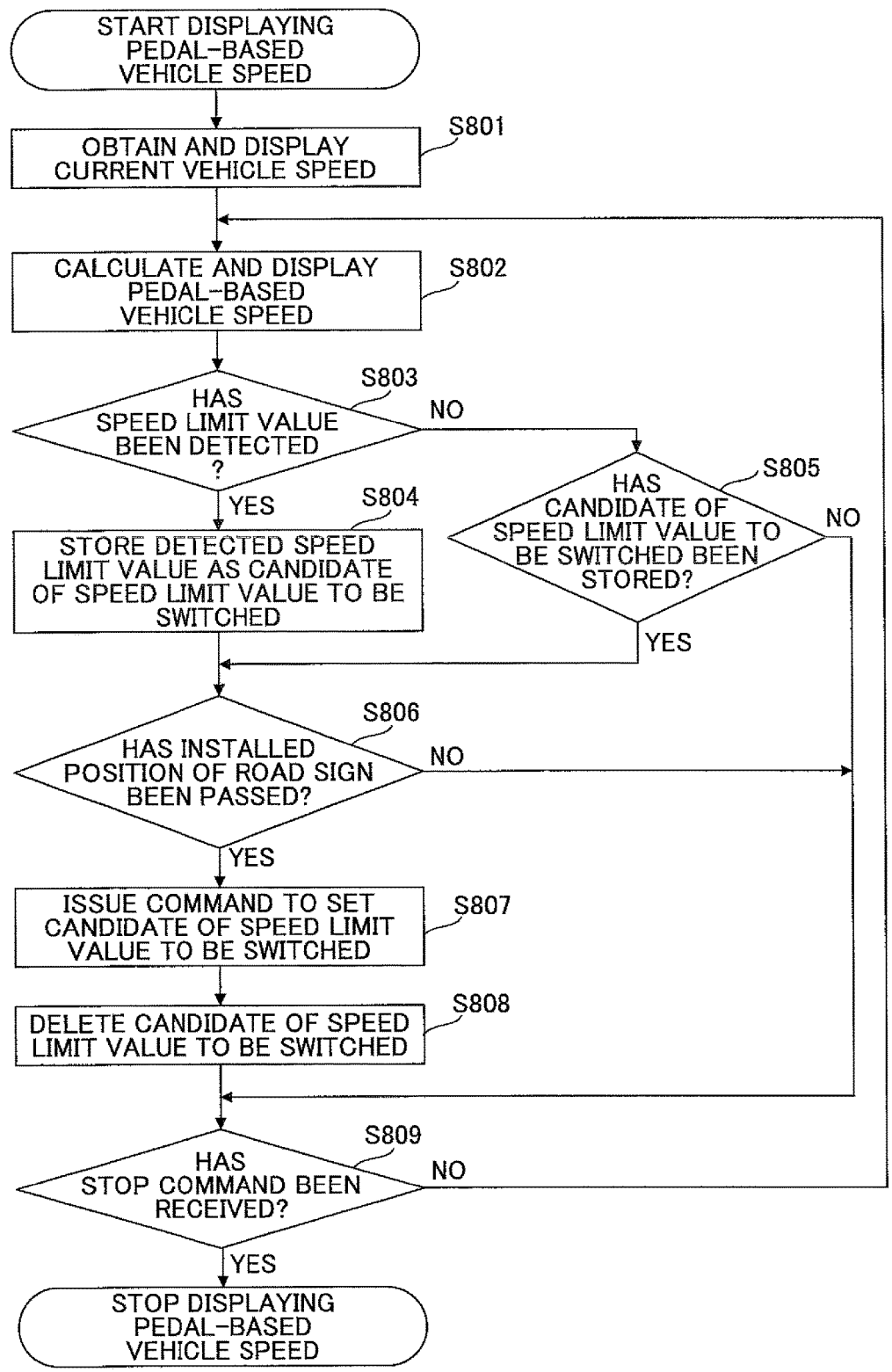
FIG. 8 is a flowchart that illustrates a flow of a process to display the pedal-based vehicle speed.

Next, a flow of a process to display the pedal-based vehicle speed by the ECU for setting the speed limit 120, will be described. FIG. 8 is a flowchart that illustrates a flow of the process to display the pedal-based vehicle speed by the ECU for setting the speed limit 120. Upon an activation of the vehicle speed limiter system, the process to display the pedal-based vehicle speed illustrated in FIG. 8 is started, and executed every predetermined cycle (for example, a cycle synchronized with a frame cycle).

At Step S801, the current vehicle speed display unit 501 of the UI control unit 123 obtains the current vehicle speed from the other ECU 140, and displays the current vehicle speed on the speed display screen 600. At Step S802, the estimation unit 306 of the pedal-based vehicle speed calculation unit 122 calculates the pedal-based vehicle speed, and indicates the calculation result to the UI control unit 123. Also, the pedal-based vehicle speed display unit 502 of the UI control unit 123 displays the pedal-based vehicle speed on the speed display screen 600.

At Step S803, the speed limit setting unit 121 determines whether the speed limit value has been detected. At Step S803, if determining that the speed limit value has been detected, the speed limit setting unit 121 goes forward to Step S804. At Step S804, the speed limit setting unit 121 stores the detected speed limit value in the switching candidate storage unit 124 as a candidate of the speed limit value to be switched.

On the other hand, at Step S803, if determining that the speed limit value has not been detected, the speed limit setting unit 121 goes forward to Step S805.

At Step S805, the speed limit setting unit 121 determines whether a candidate of the speed limit value to be switched has been stored in the switching candidate storage unit 124. At Step S805, if determining that it has not been stored, the speed limit setting unit 121 goes forward to Step S809.

On the other hand, if determining at Step S805 that it has been stored, the speed limit setting unit 121 determines that it is before passing the installed position of the road sign, and goes forward to Step S806. Note that a circumstance where a speed limit value is not detected, but a candidate of the speed limit value to be switched has been stored, may be caused, for example, by unsuccessful detection of a speed limit value from a specific frame of image information, for some reason, among frames of image information transmitted every predetermined frame cycle. This is because multiple frames of image information are received after a speed limit value has been first detected until the vehicle passes by the installed position of the road sign, and it is possible that some of the frames may include image information from which the speed limit value cannot be detected.

At Step S806, the speed limit setting unit 121 determines whether the vehicle has passed by the installed position of the road sign specifying the detected speed limit value. At Step S806, if determining that the vehicle has not yet passed it by, the speed limit setting unit 121 goes forward to Step S809.

On the other hand, at Step S806, if determining that the vehicle has passed it by, the speed limit setting unit 121 goes forward to Step S807. At Step S807, the speed limit setting unit 121 transmits the candidate of the speed limit value to be switched that has been stored in the switching candidate storage unit 124 to the other ECU 140, and issues a command to set it as the upper limit speed value.

At Step S808, the speed limit setting unit 121 deletes the candidate of the speed limit value to be switched stored in the switching candidate storage unit 124.

At Step S809, the UI control unit 123 determines whether it has received an end command of the process to display the pedal-based vehicle speed. If determining that it has not received an end command, the UI control unit 123 goes back to Step S801. On the other hand, if the vehicle speed limiter system has stopped, the UI control unit 123 determines that it has received an end command, and terminates the process to display the pedal-based vehicle speed.

<7. Summary>

As clarified by the above description, the ECU for setting the speed limit 120 according to the embodiment is configured to obtain the stepping amount on the accelerator pedal by the driver in a state where the vehicle speed of the vehicle is being limited, to calculate the driving force of the vehicle calculated based on the obtained stepping amount, and the forces reacting against the driving force, so as to estimate the vehicle speed supposed to be directly obtained by the stepping amount, as the pedal-based vehicle speed, and to display the estimated pedal-based vehicle speed on the speed display screen along with the current vehicle speed.

Thus, in a state where the vehicle speed is being limited to be less than the speed limit value, the driver can recognize the stepping amount on the acceleration pedal by himself/herself.

Consequently, the driver can judge by himself/herself whether there is a likelihood that the vehicle accelerates steeply due to the switching of the speed limit value. Also, the driver can adjust the stepping amount on the accelerator pedal before the speed limit value is switched, and safe traveling of the vehicle can be maintained when the speed limit value is switched.

[Second Embodiment]

The first embodiment is configured to display the pedal-based vehicle speed so that the driver can recognize the stepping amount on the accelerator pedal, and can judge by himself/herself whether behavior of the vehicle may change (the vehicle accelerates steeply) by the switching of the speed limit value. In contrast to this, in the second embodiment, a UI control unit determines whether the vehicle accelerates steeply by the switching of the speed limit value. Also, if determining that there is a likelihood that the vehicle accelerates steeply, the UI control unit displays a message for calling attention of the driver. In the following, the second embodiment will be described in detail, focusing on different points from the first embodiment.

<1. Functions of UI Control Unit>

Figure 9:
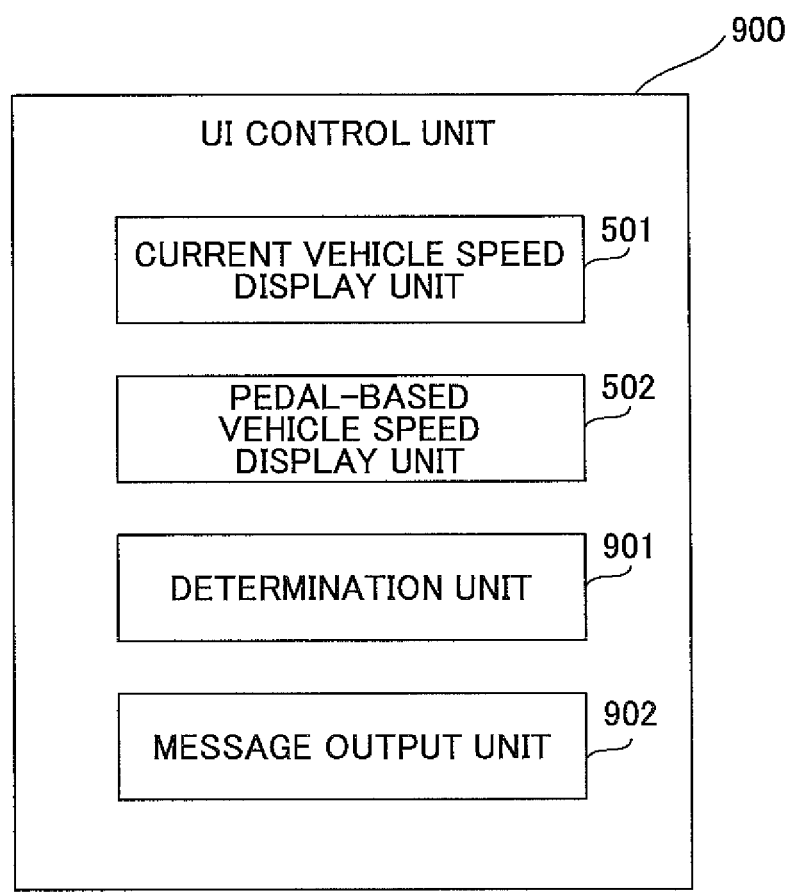
FIG. 9 is a diagram that illustrates an example of a functional configuration of a UI control unit.

First, functions of the UI control unit 900 will be described according to the embodiment. FIG. 9 is a diagram that illustrates a functional configuration of the UI control unit 900. As illustrated in FIG. 9, the UI control unit 900 includes a current vehicle speed display unit 501, a pedal-based vehicle speed display unit 502, a determination unit 901, and a message output unit 902. Among these, the current vehicle speed display unit 501 and the pedal-based vehicle speed display unit 502 have been described in the first embodiment, and their description is omitted here.

The determination unit 901 determines whether there is a likelihood that the vehicle accelerates steeply when the speed limit setting unit 121 has set a candidate of the speed limit value to be switched in the other ECU 140, and switches the upper limit speed value. If determining that there is a likelihood of steep acceleration, the determination unit 901 issues a command to the message output unit 902 to display a "message for calling attention to acceleration".

The determination unit 901 determines whether there is a likelihood of steep acceleration, based on the speed limit value currently set, the candidate of the speed limit value to be switched, the current vehicle speed, and the pedal-based vehicle speed, by determining whether all of the following items of the "condition for calling attention to acceleration" are satisfied:

the current vehicle speed is equivalent to the speed limit value currently set;

the current pedal-based vehicle speed is greater than the current vehicle speed;

the difference between the candidate of the speed limit value to be switched and the speed limit value currently set is greater than or equal to a predetermined threshold; and the current pedal-based vehicle speed is greater than the candidate of the speed limit value to be switched.

Then, if determining that the condition for calling attention to acceleration is satisfied, the determination unit 901 issues a command to the message output unit 902 to display the "message for calling attention to acceleration".

Furthermore, in a state where the message for calling attention to acceleration is being displayed, once the candidate of the speed limit value to be switched is transmitted to the other ECU 140, and the upper limit speed value is switched, the determination unit 901 determines whether it is a timing to stop displaying the message for calling attention to acceleration, and issues a command to the message output unit 902. Specifically, the determination unit 901 issues a command to the message output unit 902 to stop displaying the "message for calling attention to acceleration" if determining that one of the following items of the "terminating condition for the message for calling attention to acceleration" is satisfied:

the current pedal-based vehicle speed is less than or equal to the newly set speed limit value; and the current vehicle speed has reached the newly set speed limit value.

In response to a command to display the "message for calling attention to acceleration" from the determination unit 901, the message output unit 902 displays a predetermined message for calling attention to acceleration on the speed display screen 600. Also, in response to a command to stop displaying the "message for calling attention to acceleration" from the determination unit 901, the message output unit 902 stops displaying the message for calling attention to acceleration.

<2. Display Examples of Speed Display Screen in Traveling Scenes>

Figure 10:
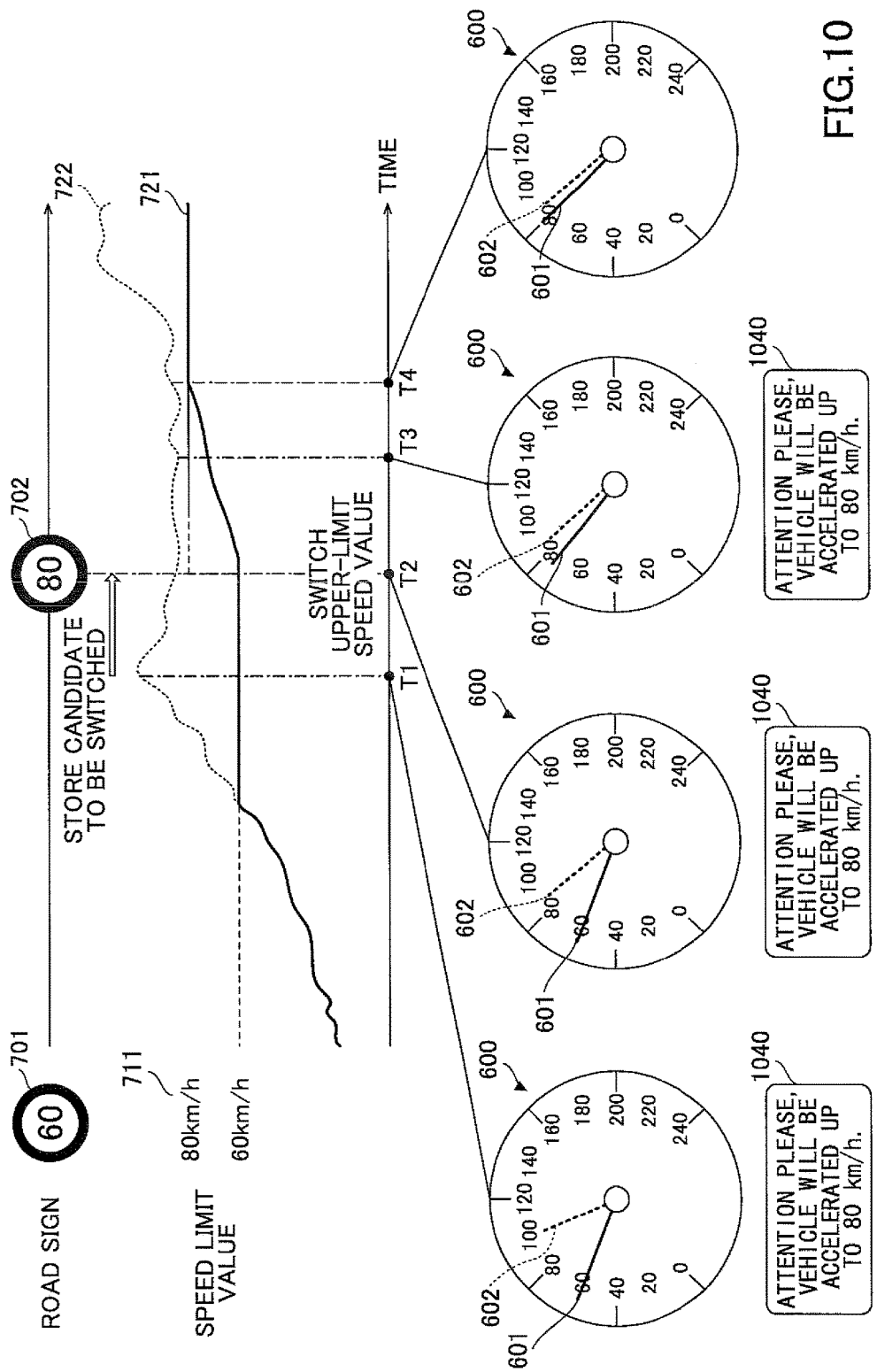
FIG. 10 is a diagram that illustrates display examples of a speed display screen in traveling scenes.

Next, display examples of the speed display screen 600 in traveling scenes will be described. FIG. 10 is a diagram that illustrates display examples of the speed display screen 600 in traveling scenes.

Specifically, the figure illustrates display examples of the speed display screen 600 in traveling scenes in a case where travelling has been started in state where a speed limit value 711 of "60 km/h" has been detected based on a road sign 701, and an upper limit speed value of "60 km/h" has been set in the other ECU 140.

As illustrated in FIG. 10, the speed limit setting unit 121 detects a speed limit value based on a road sign 702 at time T1, and stores a candidate of the speed limit value to be switched in the switching candidate storage unit 124. Once the speed limit setting unit 121 stores the candidate of the speed limit value to be switched, the determination unit 901 determines whether there is a likelihood that the vehicle accelerates steeply by determining whether the condition for calling attention to acceleration is satisfied.

At time T1, the determination unit 901 determines that the condition for calling attention to acceleration is satisfied because the current vehicle speed 721="60 km/h" is equivalent to the speed limit value currently set 711="60 km/h";

the current pedal-based vehicle speed 722="100 km/h" is greater than the current vehicle speed 721="60 km/h";

the difference="20 km/h" between the candidate of the speed limit value to be switched="80 km/h" and the speed limit value currently set 711="60 km/h" is greater than or equal to a predetermined threshold; and the current pedal-based vehicle speed 722="100 km/h" is greater than the candidate of the speed limit value to be switched="80 km/h". Consequently, the message for calling attention to acceleration 1040 is displayed on the speed display screen 600.

Also, as illustrated in FIG. 10, at time T2, the vehicle passes by the position where the road sign 702 is installed. When the vehicle passes by the position where the road sign 702 is installed, the speed limit setting unit 121 transmits the candidate of the speed limit value to be switched to the other ECU 140, and issues a command to set it as the upper limit speed value. Thus, the candidate of the speed limit value to be switched (="80 km/h") is set, and the upper limit speed value is switched.

After the upper limit speed value has been switched by the candidate of the speed limit value to be switched (="80 km/h"), the message for calling attention to acceleration is displayed on the speed display screen 600 until the terminating condition for the message for calling attention to acceleration is satisfied.

At time T2, the determination unit 901 determines that the terminating condition for the message for calling attention to acceleration is not satisfied because the current pedal-based vehicle speed 722="87 km/h" is not less than or equal to the newly set speed limit value="80 km/h"; and the current vehicle speed 721="60 km/h" does not reach the newly set speed limit value="80 km/h". Consequently, displaying the message for calling attention to acceleration 1040 on the speed display screen 600 continues.

Similarly, at time T3, the determination unit 901 determines that the terminating condition for the message for calling attention to acceleration is not satisfied because the current pedal-based vehicle speed 722="87 km/h" is not less than or equal to the newly set speed limit value="80 km/h"; and the current vehicle speed 721="72 km/h" does not reach the newly set speed limit value="80 km/h". Consequently, displaying the message for calling attention to acceleration 1040 on the speed display screen 600 continues.

On the other hand, at time T4, the determination unit 901 determines that the terminating condition for the message for calling attention to acceleration is satisfied because the current vehicle speed 721="80 km/h" has reached the newly set speed limit value (="80 km/h"). Consequently, displaying the message for calling attention to acceleration 1040 on the speed display screen 600 ends.

<3. Other Display Examples of Speed Display Screen in Traveling Scenes>

Figure 11:
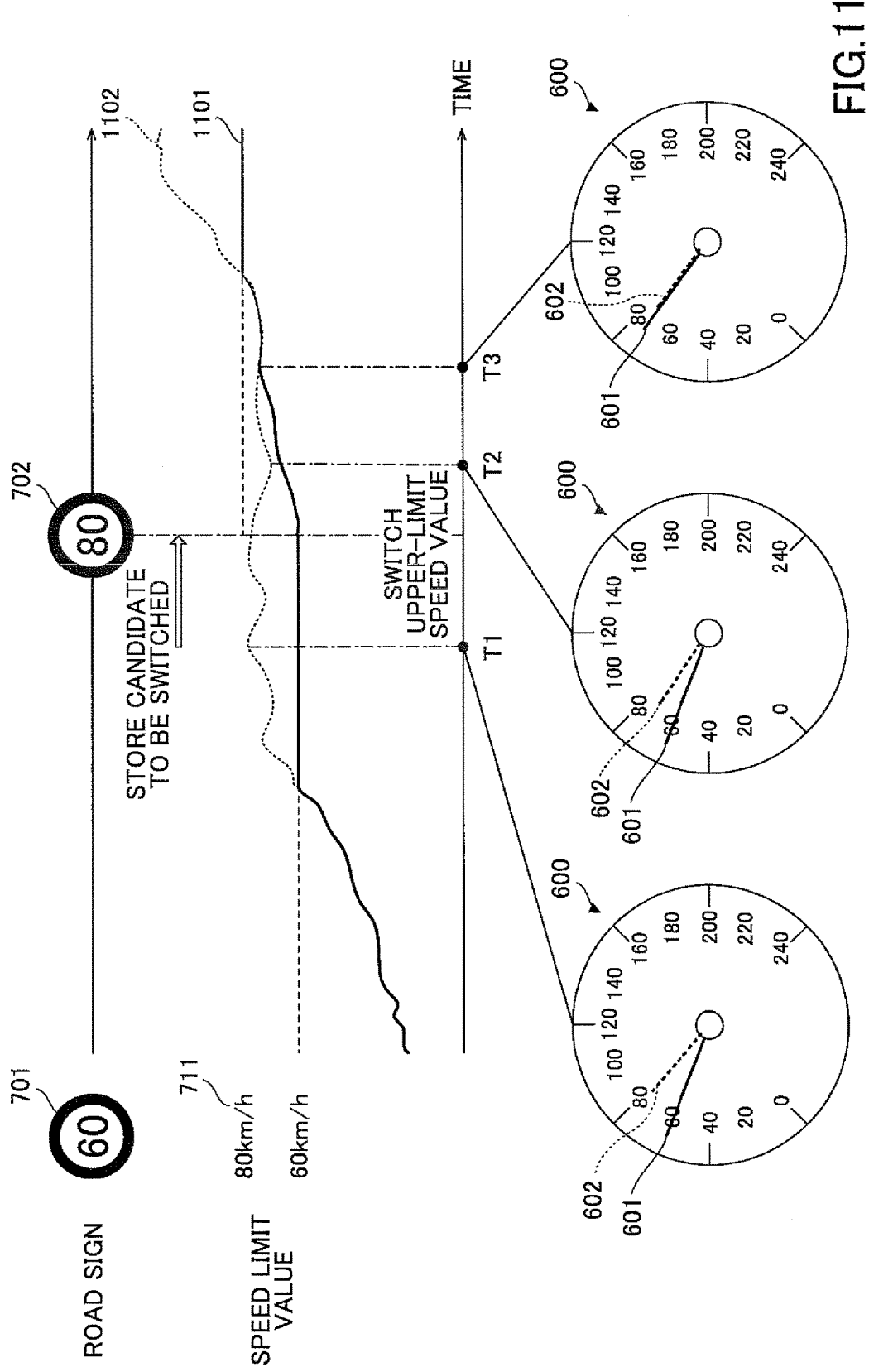
FIG. 11 is a diagram that illustrates display examples of a speed display screen in traveling scenes.

Next, other display examples of the speed display screen 600 in traveling scenes will be described. FIG. 11 is a diagram that illustrates other display examples of the speed display screen 600 in traveling scenes. FIG. 10 illustrates a case where the condition for calling attention to acceleration is satisfied, whereas FIG. 11 illustrates a case where the condition for calling attention to acceleration is not satisfied.

At time T1, the determination unit 901 determines that the condition for calling attention to acceleration is not satisfied because the current pedal-based vehicle speed 1102="78 km/h" is less than the candidate of the speed limit value to be switched="80 km/h". Consequently, the message for calling attention to acceleration is not displayed on the speed display screen 600.

In the example in FIG. 11, the state determined that the condition for calling attention to acceleration is not satisfied continues until the vehicle passes by the position where the road sign 702 is installed. Therefore, the vehicle will not accelerate steeply even if the candidate of the speed limit value to be switched (="80 km/h") is set, and the upper limit speed value is switched. Therefore, there is no need to display the message for calling attention to acceleration.

Consequently, in the example in FIG. 11, the message for calling attention to acceleration is not displayed before and after the switching of the upper limit speed value, and after the switching, the current vehicle speed 1101 approaches the pedal-based vehicle speed 1102 (see time T2). Then, at time T3, the current vehicle speed 1101 becomes equivalent to the pedal-based vehicle speed 1102.

Figure 12:
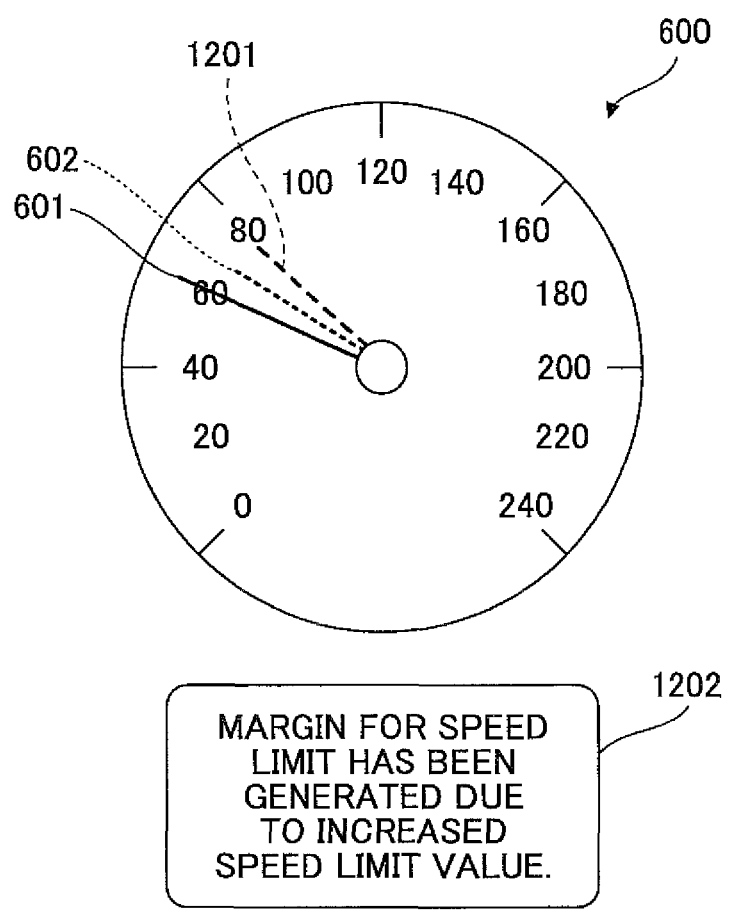
FIG. 12 is a diagram that illustrates another display example of a speed display screen.

Note that if the current pedal-based vehicle speed 1102 is less than the candidate of the speed limit value to be switched as in the example in FIG. 11, another message may be displayed, for example, as in FIG. 12. FIG. 12 is a diagram that illustrates another display example of the speed display screen 600, and includes an example of a message 1202 to be displayed on the speed display screen 600 if the current pedal-based vehicle speed 1102 is less than the candidate of the speed limit value to be switched.

As illustrated in FIG. 12, by indicating to the driver that the pedal-based vehicle speed 1102 has a margin for the upper limit speed value upon the switching of the upper limit speed value, the driver can recognize that he/she may increase the stepping amount on the acceleration pedal 141.

Note that the example in FIG. 12 includes yet another indicator hand 1201 to indicate the candidate of the speed limit value to be switched. Thus, if the upper limit speed value is switched, the driver can easily recognize how much margin is allowed for the pedal-based vehicle speed 1102 with respect to the upper limit speed value after the switching.

<4. Flow of Process to Display the Pedal-based Vehicle Speed>

Figure 13:
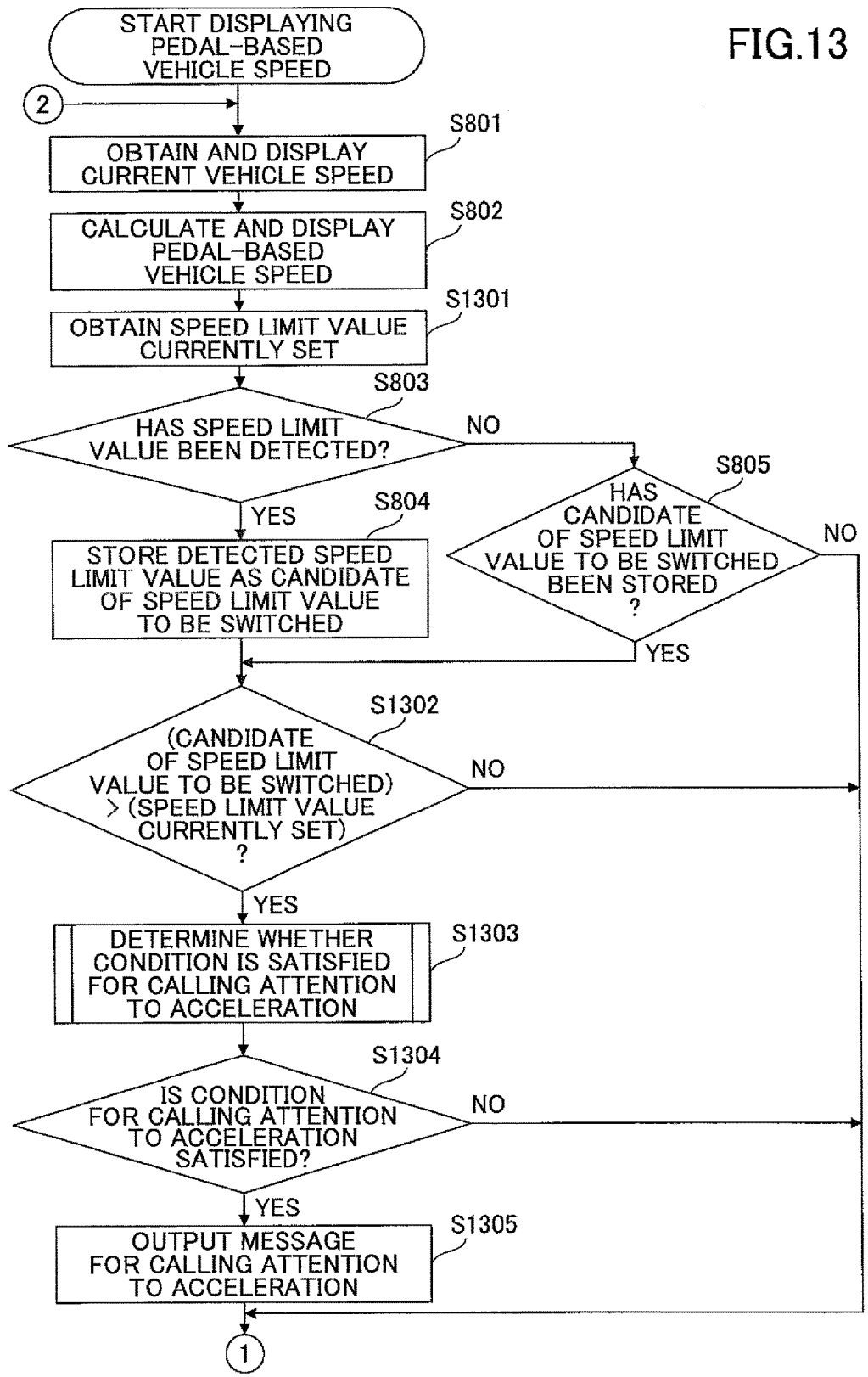
FIG. 13 is a part of a flowchart that illustrates a flow of a process to display the pedal-based vehicle speed.
Figure 14:
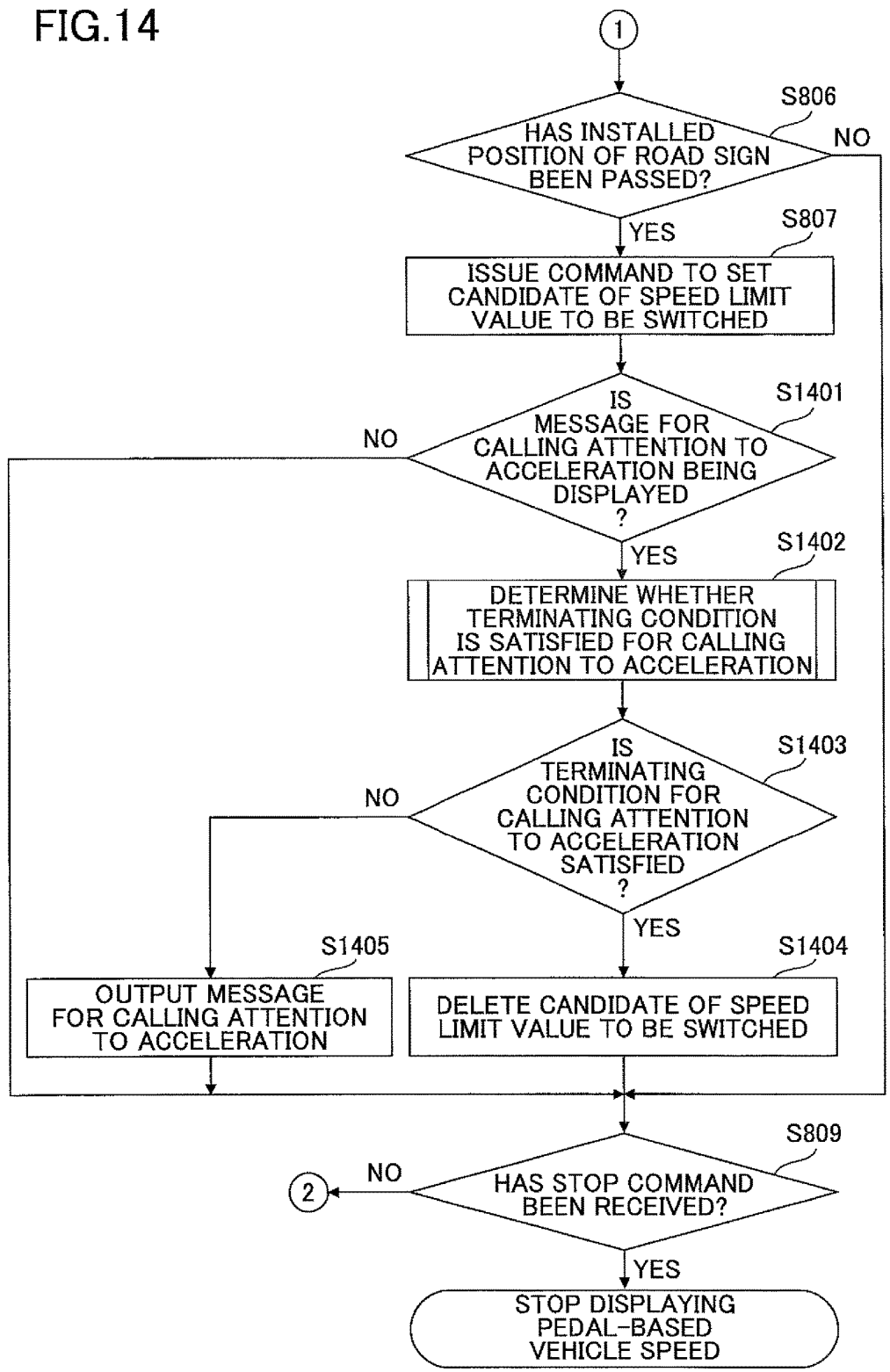
FIG. 14 is another part of the flowchart that illustrates the flow of a process to display the pedal-based vehicle speed.

Next, a flow of a process to display the pedal-based vehicle speed by the ECU for setting the speed limit 120, will be described. FIG. 13 and FIG. 14 constitute a flowchart that illustrates a flow of a process to display the pedal-based vehicle speed by the ECU for setting the speed limit 120. Upon an activation of the vehicle speed limiter system, the process to display the pedal-based vehicle speed illustrated in FIG. 13 and FIG. 14 is started, and executed every predetermined cycle (for example, a cycle synchronized with a frame cycle). Note that substantially the same steps as the steps in the process to display the pedal-based vehicle speed illustrated in FIG. 8 are assigned the same reference numbers, and their description is omitted here. Steps S1301 to S1305 in FIG. 13 and Steps S1401 to S1405 in FIG. 14 are different from FIG. 8.

At Step S1301, the determination unit 901 of the UI control unit 900 obtains a speed limit value that has been detected by the speed limit setting unit 121 and has already been set as the upper limit speed value in the other ECU 140.

At Step S1302, the determination unit 901 of the UI control unit 900 determines whether the candidate of the speed limit value to be switched is greater than the speed limit value currently set. At Step S1302, if determining that the candidate of the speed limit value to be switched is greater than the speed limit value currently set, the determination unit 901 determines that the upper limit speed value will increase by the switching, and goes forward to Step S1303.

At Step S1303, the determination unit 901 of the UI control unit 900 determines whether the condition for calling attention to acceleration is satisfied. Note that a process to determine whether the condition for calling attention to acceleration is satisfied that is executed by the determination unit 901 of the UI control unit 900, will be described in detail later.

As a result of the process to determine whether the condition for calling attention to acceleration is satisfied, if determining that the condition for calling attention to acceleration is satisfied, the determination unit 901 goes forward to Step S1305 from Step S1304. At Step S1305, the message output unit 902 of the UI control unit 900 displays the message for calling attention to acceleration. After that, the determination unit 901 goes forward to Step S806 in FIG. 14.

On the other hand, at Step S1302, if determining that the candidate of the speed limit value to be switched is less than or equal to the speed limit value currently set, or if determining at Step S1304 that the condition for calling attention to acceleration is not satisfied, the determination unit 901 goes directly forward to Step S806 in FIG. 14.

At Step S1401 in FIG. 14, the determination unit 901 of the UI control unit 900 determines whether the message for calling attention to acceleration is currently displayed. If determining that the message for calling attention to acceleration is not displayed, the determination unit 901 goes forward to Step S809. On the other hand, the message for calling attention to acceleration is currently displayed, the determination unit 901 goes forward to Step S1402.

At Step S1402, the determination unit 901 of the UI control unit 900 determines whether the terminating condition for the message for calling attention to acceleration is satisfied. Note that a process to determine whether the terminating condition for the message for calling attention to acceleration is satisfied will be described in detail later.

As a result of determination at Step S1402, if determining that the terminating condition for the message for calling attention to acceleration is satisfied, the determination unit 901 goes forward to Step S1404 from Step S1403. At Step S1404, the determination unit 901 of the UI control unit 900 deletes the candidate of the speed limit value to be switched from the switching candidate storage unit 124. Thus, displaying the message for calling attention to acceleration ends thereafter.

On the other hand, if determining that the terminating condition for the message for calling attention to acceleration is not satisfied, the determination unit 901 goes forward to Step S1405 from Step S1403. At Step S1405, the determination unit 901 of the UI control unit 900 issues a command to display the message for calling attention to acceleration. Thus, the message output unit 902 of the UI control unit 900 continues to display the message for calling attention to acceleration.

<5. Details of Process to Determine Whether the Condition for Calling Attention to Acceleration is Satisfied>

Figure 15A:
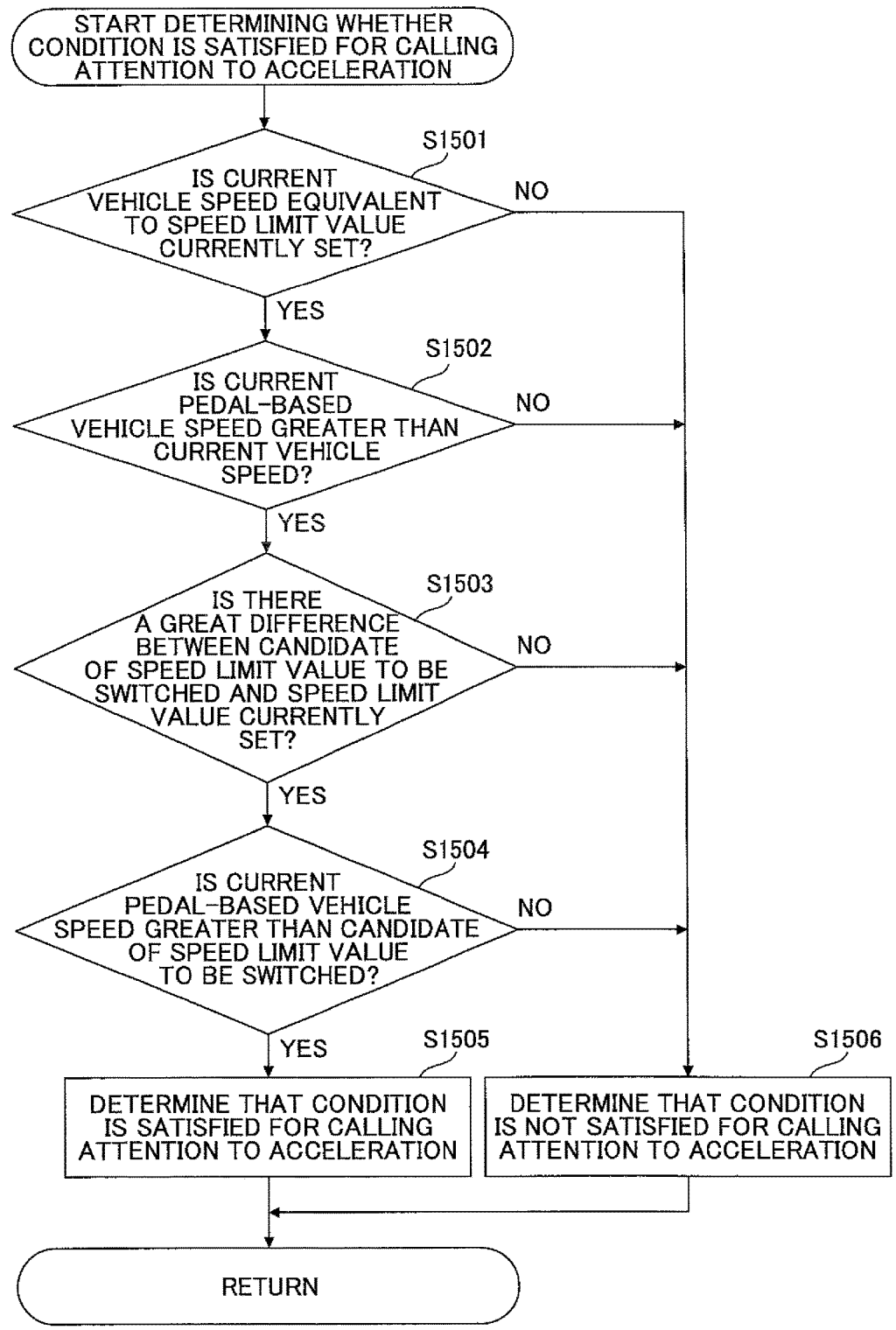

Next, the process to determine whether the condition for calling attention to acceleration is satisfied (Step S1303) in the process to display the pedal-based vehicle speed, will be described in detail. FIG. 15A is a flowchart that illustrates a flow of the process to determine whether the condition for calling attention to acceleration is satisfied.

At Step S1501, the determination unit 901 of the UI control unit 900 determines whether the current vehicle speed is equivalent to the speed limit value currently set. At Step S1501, if determining that they are not equivalent, the determination unit 901 goes forward to Step S1506. On the other hand, at Step S1501, if determining that they are equivalent, the determination unit 901 goes forward to goes forward to Step S1502.

At Step S1502, the determination unit 901 of the UI control unit 900 determines whether the current pedal-based vehicle speed is greater than the current vehicle speed. At Step S1502, if determining that it is not greater, the determination unit 901 goes forward to Step S1506. On the other hand, at Step S1502, if determining that it is greater, the determination unit 901 goes forward to goes forward to Step S1503.

At Step S1503, the determination unit 901 of the UI control unit 900 determines whether the difference between the candidate of the speed limit value to be switched and the speed limit value currently set is greater than or equal to the predetermined threshold. At Step S1503, if determining that it is less than the predetermined threshold, the determination unit 901 goes forward to goes forward to Step S1506. On the other hand, if determining that it is greater than or equal to the predetermined threshold, the determination unit 901 goes forward to goes forward to Step S1504.

At Step S1504, the determination unit 901 of the UI control unit 900 determines whether the current pedal-based vehicle speed is greater than the candidate of the speed limit value to be switched. At Step S1504, if determining that the current pedal-based vehicle speed is less than or equal to the candidate of the speed limit value to be switched, the determination unit 901 goes forward to goes forward to Step S1506. On the other hand, if determining that the current pedal-based vehicle speed is greater than the candidate of the speed limit value to be switched, the determination unit 901 goes forward to goes forward to Step S1505.

At Step S1505, the determination unit 901 of the UI control unit 900 determines that the condition for calling attention to acceleration is satisfied, and goes back to Step S1304 in FIG. 13. Also, at Step S1506, the determination unit 901 of the UI control unit 900 determines that the condition for calling attention to acceleration is not satisfied, and goes back to Step S1304 in FIG. 13.

<6. Details of Process to Determine Whether the Terminating Condition for Calling Attention to Acceleration is Satisfied>

Next, the process to determine whether the terminating condition for calling attention to acceleration is satisfied (Step S1401) in the process to display the pedal-based vehicle speed, will be described in detail. FIG. 15B is a flowchart that illustrates a flow of the process to determine whether the terminating condition for calling attention to acceleration is satisfied.

At Step S1311, the determination unit 901 of the UI control unit 900 determines whether the current pedal-based vehicle speed is greater than the newly set speed limit value. At Step S1511, if determining that the current pedal-based vehicle speed is less than or equal to the newly set speed limit value, the determination unit 901 goes forward to Step S1514. On the other hand, at Step S1511, if determining that the current pedal-based vehicle speed is greater than the newly set speed limit value, the determination unit 901 goes forward to Step S1512.

At Step S1512, the determination unit 901 of the UI control unit 900 determines whether the current vehicle speed has reached the newly set speed limit value. At Step S1512, if determining that it does not reach, the determination unit 901 goes forward to Step S1514. On the other hand, at Step S1514, if determining that it has reached, the determination unit 901 goes forward to Step S1513.

At Step S1513, the determination unit 901 of the UI control unit 900 determines that the terminating condition for the message for calling attention to acceleration is not satisfied, and goes back to Step S1402 in FIG. 14. Also, at Step S1514, the determination unit 901 of the UI control unit 900 determines that the terminating condition for the message for calling attention to acceleration is satisfied, and goes back to Step S1402 in FIG. 14.

<7. Summary>

As clarified by the above description, the ECU for setting the speed limit 120 according to the embodiment is configured to determine whether there is a likelihood that the vehicle accelerates steeply due to the switching of the speed limit value, based on the condition for calling attention to acceleration, and to display the message for calling attention to acceleration if determining that there is a likelihood that the vehicle accelerates steeply when the condition for calling attention to acceleration is satisfied.

Thus, the driver can recognize that there is a likelihood that behavior of the vehicle may change (the vehicle accelerates steeply) when the speed limit value is switched, due to the stepping amount on the accelerator pedal by himself/herself, before the switching.

Consequently, the driver can adjust the stepping amount on the accelerator pedal by himself/herself before the speed limit value is switched, and safe traveling of the vehicle can be maintained when the speed limit value is switched.

[Third Embodiment]

The second embodiment is configured to display the message for calling attention to acceleration so that behavior of the vehicle will not change (the vehicle accelerates steeply) when the speed limit value is switched. In contrast to this, the third embodiment is configured to display a message for calling attention to collision so that the vehicle will not collide with a preceding vehicle due to behavioral change of the vehicle (the vehicle accelerates steeply) when the speed limit value is switched. Note that a "preceding vehicle" may be a vehicle that is traveling ahead of the vehicle on the same lane, or may be a vehicle that is traveling ahead of the vehicle on an adjacent lane, and is attempting to change into the same lane. In the following, the third embodiment will be described in detail, focusing on different points from the second embodiment.

<1. Functions of UI Control Unit>

Figure 16:
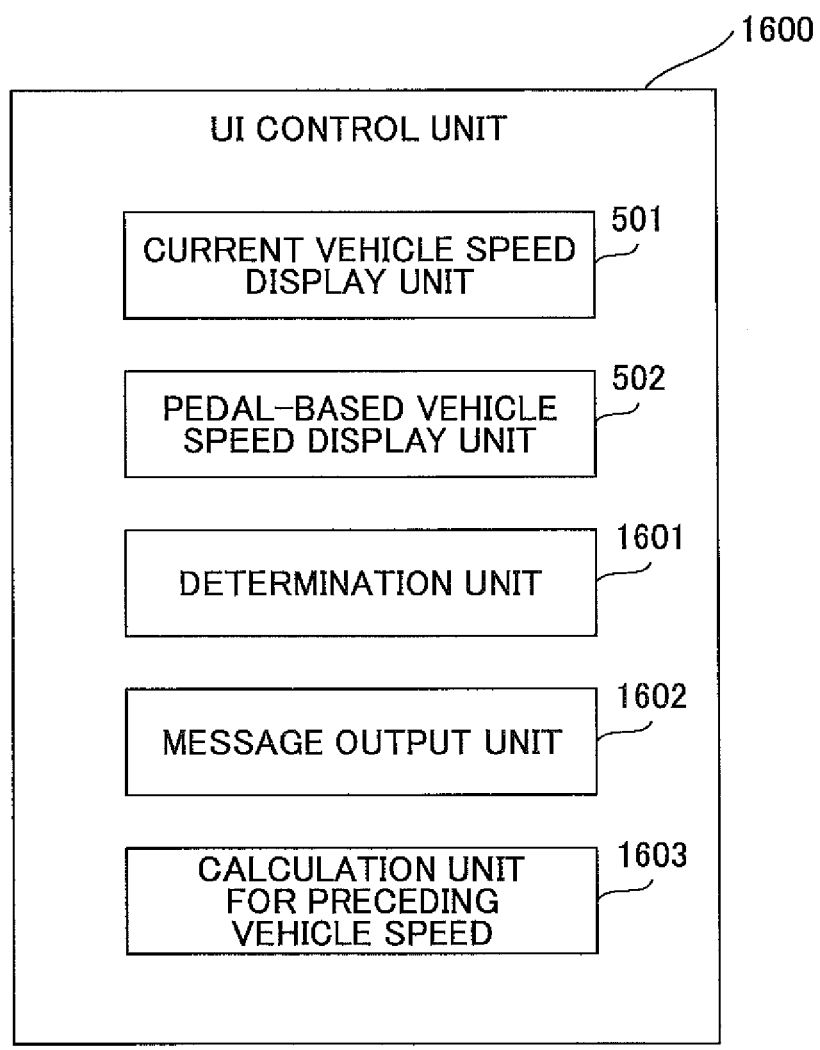
FIG. 16 is a diagram that illustrates an example of a functional configuration of a UI control unit.

First, functions of the UI control unit 1600 will be described according to the embodiment. FIG. 16 is a diagram that illustrates an example of a functional configuration of the UI control unit 1600. As illustrated in FIG. 16, the UI control unit 1600 includes a current vehicle speed display unit 501, a pedal-based vehicle speed display unit 502, a determination unit 1601, a message output unit 1602, and a preceding vehicle speed calculation unit 1603. Among these, the current vehicle speed display unit 501 and the pedal-based vehicle speed display unit 502 have been described in the first embodiment, and their description is omitted here.

The determination unit 1601 determines whether there is a likelihood that the vehicle accelerates steeply, and collides with a preceding vehicle when the speed limit setting unit 121 has set a candidate of the speed limit value to be switched in the other ECU 140, and switches the upper limit speed value. Also, if determining that there is a likelihood of collision, the determination unit 901 issues a command to the message output unit 902 to display a "message for calling attention to collision".

To determine whether there is a likelihood that the vehicle collides with a preceding vehicle, the determination unit 1601 determines, based on the speed limit value currently set, the candidate of the speed limit value to be switched, the current vehicle speed, the pedal-based vehicle speed, and the current vehicle speed of the preceding vehicle, whether all of the following items of the "condition for calling attention to collision" are satisfied:

the current vehicle speed is equivalent to the speed limit value currently set;

the current pedal-based vehicle speed is greater than the current vehicle speed;

the difference between the candidate of the speed limit value to be switched and the speed limit value currently set is greater than or equal to a predetermined threshold;

the current pedal-based vehicle speed is greater than the current vehicle speed of the preceding vehicle; and the candidate of the speed limit value to be switched is greater than the current vehicle speed of the preceding vehicle.

Then, if determining that the condition for calling attention to collision is satisfied, the determination unit 1601 issues a command to the message output unit 1602 to display a "message for calling attention to collision".

Furthermore, in a state where the message for calling attention to collision is being displayed, once the candidate of the speed limit value to be switched is transmitted to the other ECU 140, and the upper limit speed value is switched, the determination unit 1601 determines whether it is a timing to stop displaying the message for calling attention to collision, and issues a command to the message output unit 1602. Specifically, the determination unit 901 issues a command to the message output unit 1602 to stop displaying the "message for calling attention to collision" if determining that one of the following items of the "terminating condition for the message for calling attention to collision" is satisfied:

the current pedal-based vehicle speed is less than or equal to the current vehicle speed of the preceding vehicle, and is less than or equal to the newly set speed limit value; and the current vehicle speed is less than or equal to the current vehicle speed of the preceding vehicle, and has reached the newly set speed limit value.

In response to a command to display the "message for calling attention to collision" from the determination unit 1601, the message output unit 1602 displays a predetermined message for calling attention to collision on the speed display screen 600. Also, in response to a command to stop displaying the "message for calling attention to collision" from the determination unit 1601, the message output unit 1602 stops displaying the message for calling attention to collision.

The preceding vehicle speed calculation unit 1603 determines whether there is a preceding vehicle, and if determining that there is a preceding vehicle, calculates the current vehicle speed of the preceding vehicle. Note that the current vehicle speed of the preceding vehicle may be calculated based on temporal change of the distance to the preceding vehicle (namely, the relative speed with respect to the vehicle), and the current vehicle speed of the vehicle where the distance to the preceding vehicle is calculated, for example, based on a measurement result of a separately provided sensor to measure the distance to the preceding vehicle.

<2. Display Examples of Speed Display Screen in Traveling Scenes>

Figure 17:
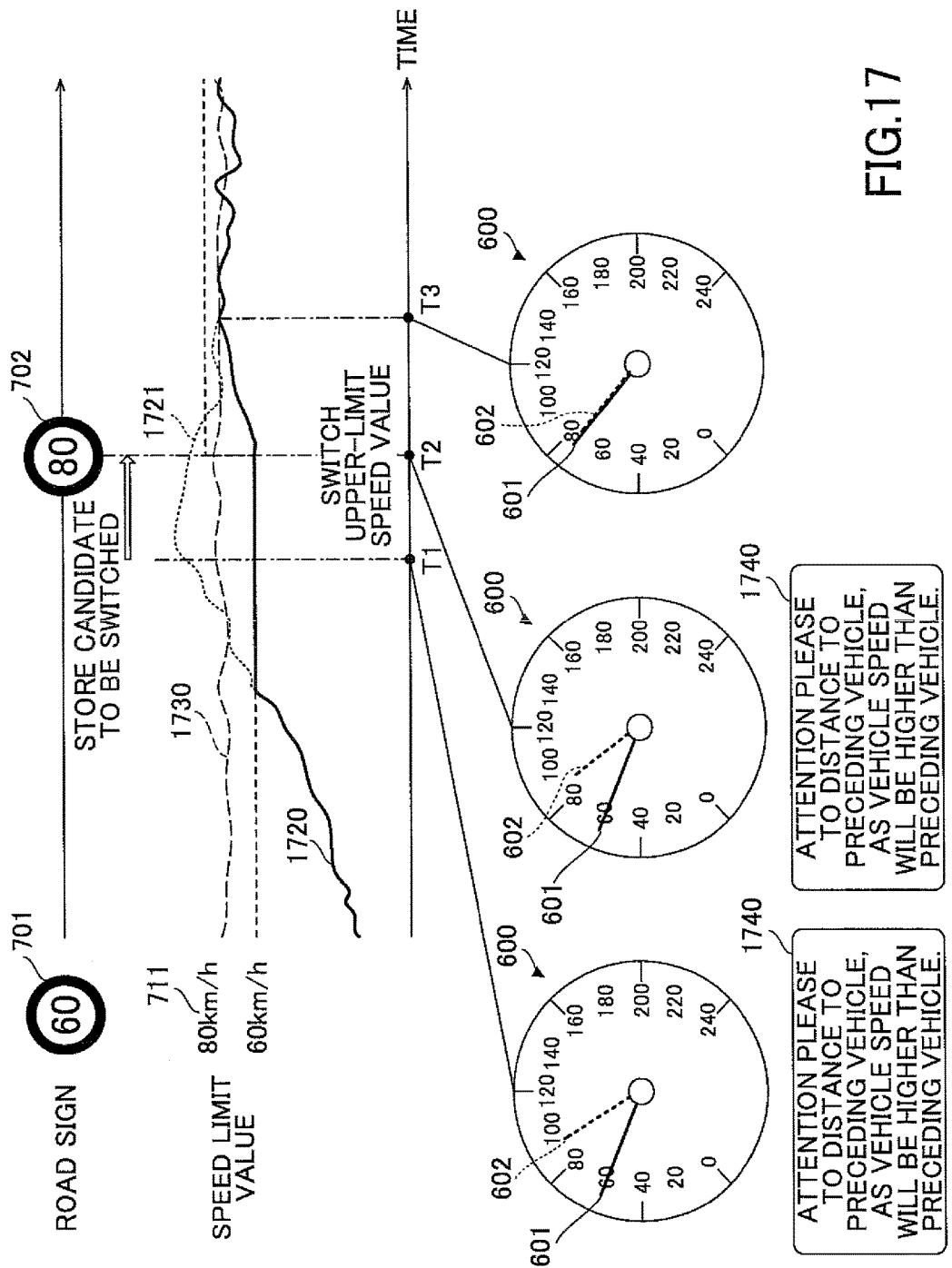
FIG. 17 is a diagram that illustrates display examples of a speed display screen in traveling scenes.

Next, display examples of the speed display screen 600 in traveling scenes will be described. FIG. 17 is a diagram that illustrates display examples of the speed display screen 600 in traveling scenes.

Specifically, the figure illustrates display examples of the speed display screen 600 in traveling scenes in a case where travelling has been started in a state where a speed limit value 711 of "60 km/h" has been detected based on a road sign 701, and an upper limit speed value of "60 km/h" has been set in the other ECU 140.

As illustrated in FIG. 17, the speed limit setting unit 121 detects a speed limit value based on a road sign 702 at time T1, and stores a candidate of the speed limit value to be switched in the switching candidate storage unit 124. Once the speed limit setting unit 121 stores the candidate of the speed limit value to be switched, the determination unit 1601 determines whether there is a likelihood of a collision with the preceding vehicle, by determining whether the condition for calling attention to collision is satisfied.

At time T1, the determination unit 901 determines that the condition for calling attention to collision is satisfied because the current vehicle speed 1720="60 km/h" is equivalent to the speed limit value currently set 711="60 km/h";

the current pedal-based vehicle speed 1721="87 km/h" is greater than the current vehicle speed 1720="60 km/h";

the difference="20 km/h" between the candidate of the speed limit value to be switched="80 km/h" and the speed limit value currently set 711="60 km/h" is greater than or equal to a predetermined threshold;

the current pedal-based vehicle speed 1721="87 km/h" is greater than the current vehicle speed of the preceding vehicle 1730="76 km/h"; and the candidate of the speed limit value to be switched="80 km/h" is greater than the current vehicle speed of the preceding vehicle 1730="76 km/h". Consequently, the message for calling attention to collision 1740 is displayed on the speed display screen 600. Note that in the example in FIG. 17, in response to the message for calling attention to collision 1740 being displayed, the driver gradually decreases the stepping amount on the acceleration pedal 141 (the pedal-based vehicle speed 1721 gradually decreases).

As illustrated in FIG. 17, at time T2, the vehicle passes by the position where the road sign 702 is installed. When the vehicle passes by the position where the road sign 702 is installed, the speed limit setting unit 121 transmits the candidate of the speed limit value to be switched to the other ECU 140, and issues a command to set it as the upper limit speed value. Thus, the candidate of the speed limit value to be switched (="80 km/h") is set, and the upper limit speed value is switched.

After the upper limit speed value has been switched by the candidate of the speed limit value to be switched (="80 km/h"), the message for calling attention to collision is displayed on the speed display screen 600 until the terminating condition for the message for calling attention to collision is satisfied.

At time T2, the determination unit 901 determines that the terminating condition for the message for calling attention to collision is not satisfied because the current pedal-based vehicle speed 1721="85 km/h" is not less than or equal to the newly set speed limit value 711 (="80 km/h"); and the current vehicle speed 1720="60 km/h" does not reach the newly set speed limit value 711 (="80 km/h"). Consequently, displaying the message for calling attention to collision 1740 on the speed display screen 600 continues.

On the other hand, at time T3, the determination unit 901 determines that the terminating condition for the message for calling attention to collision is satisfied because the current pedal-based vehicle speed 1721="75 km/h" is less than or equal to the newly set speed limit value 711 (="80 km/h"). Consequently, displaying the message for calling attention to collision 1740 on the speed display screen 600 ends.

Note that in the example in FIG. 17, at time T3, the current pedal-based vehicle speed 1721 becomes equivalent to the current vehicle speed 1720, and thereafter, the vehicle speed is limited depending on the stepping amount on the acceleration pedal 141 by the driver. The current vehicle speed 1720 after time T3 is roughly the same as the current vehicle speed of the preceding vehicle 1730, and hence, the vehicle is unlikely to collide with the preceding vehicle.

Note that in the example in FIG. 17, although the message for calling attention to collision 1740 is displayed to make the driver recognize that there is a likelihood of collision with the preceding vehicle, the display on the speed display screen 600 is not limited to the message for calling attention to collision 1740.

Figure 18:
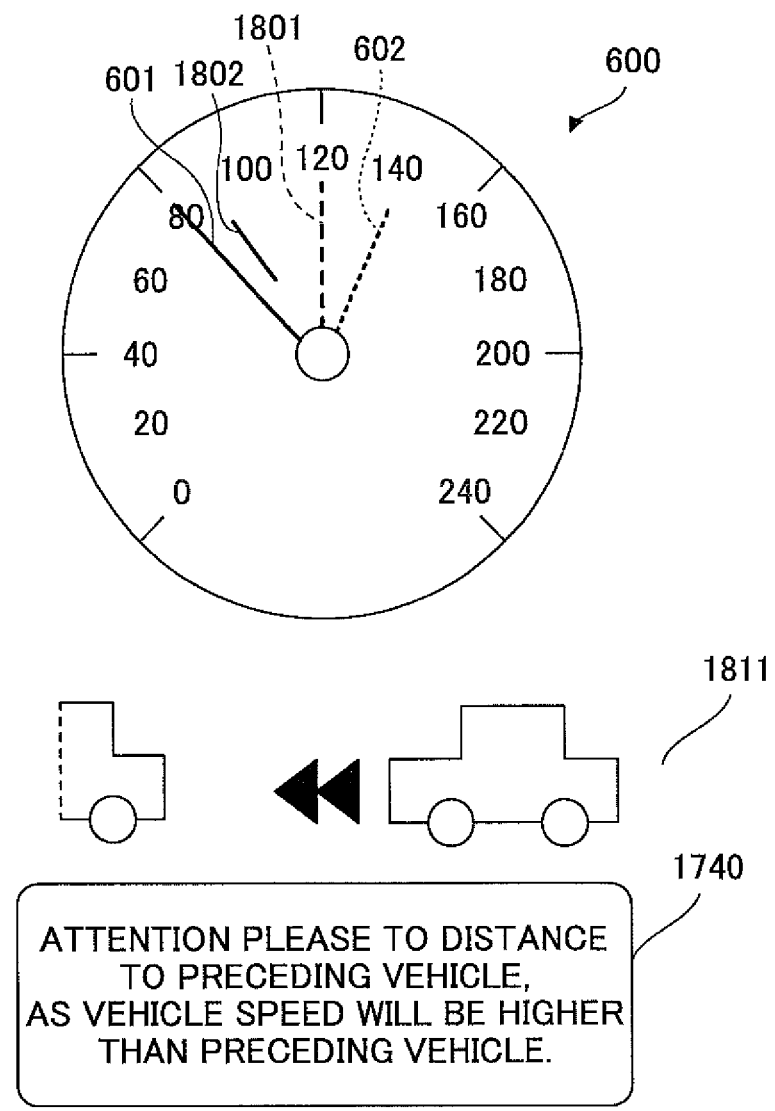
FIG. 18 is a diagram that illustrates another display example of a speed display screen.

FIG. 18 is a diagram that illustrates another display example of the speed display screen 600, to make the driver recognize that there is a likelihood of collision with the preceding vehicle. In FIG. 18, an indicator hand 1801 indicates the speed limit value to be newly set, and an indicator hand 1802 indicates the current vehicle speed of the preceding vehicle. Also, an animation 1811 is a display for showing that there is a likelihood of collision with the preceding vehicle.

In this way, by contrastively displaying the speed limit value to be newly set along with the pedal-based vehicle speed, the driver can recognize that the vehicle may accelerate steeply up to the speed limit value to be newly set. Also, by contrastively displaying the current vehicle speed of the preceding vehicle along with the speed limit value to be newly set, the driver can recognize that the current vehicle speed of the preceding vehicle is between the current vehicle speed of the vehicle and the speed limit value to be newly set, and there is a likelihood of collision with the preceding vehicle.

<3. Flow of Process to Display the Pedal-Based Vehicle Speed>

Figure 19:
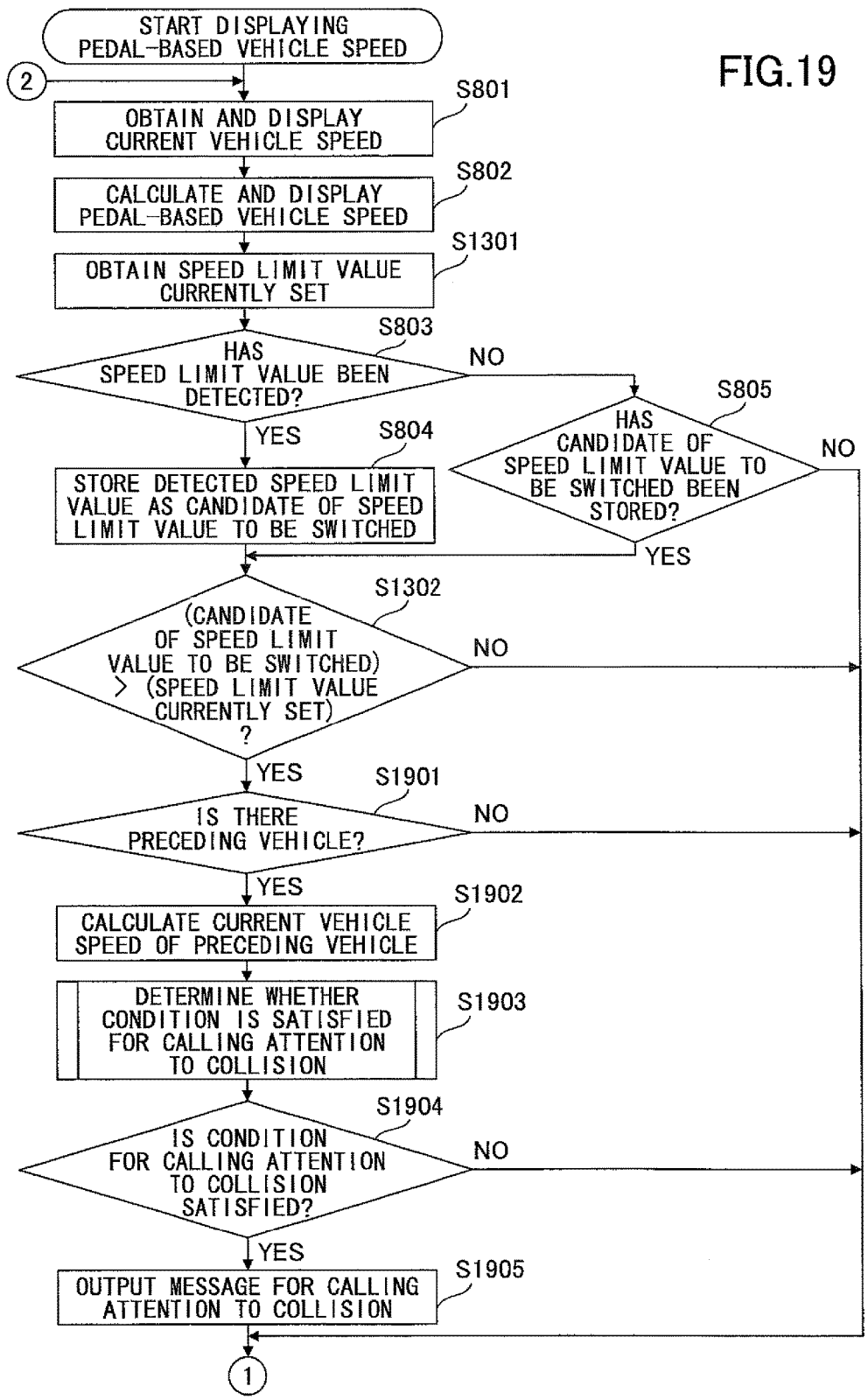
FIG. 19 is a part of a flowchart that illustrates a flow of a process to display the pedal-based vehicle speed.
Figure 20:
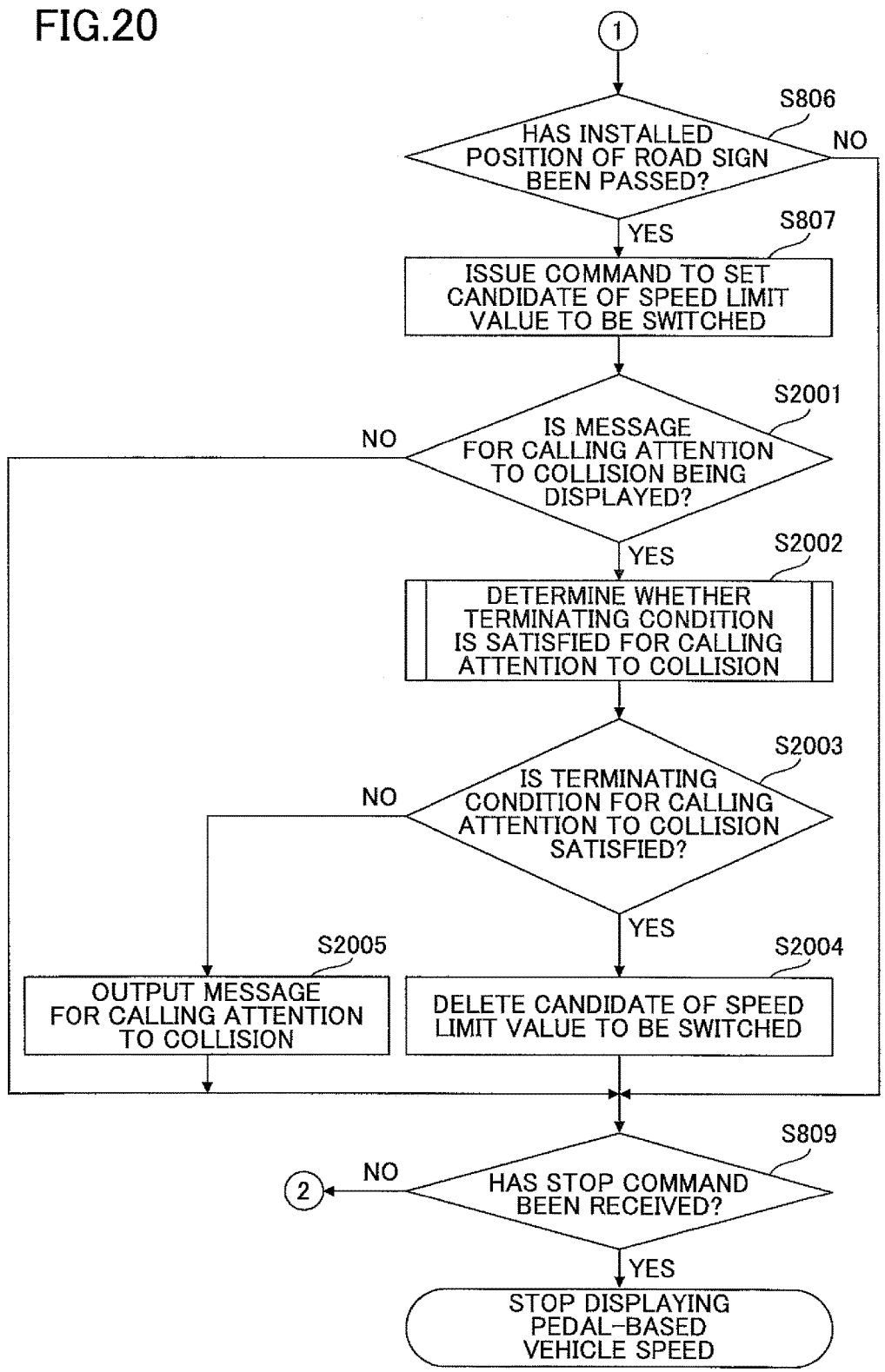
FIG. 20 is another part of the flowchart that illustrates the flow of a process to display the pedal-based vehicle speed.

Next, a flow of a process to display the pedal-based vehicle speed by the ECU for setting the speed limit 120, will be described. FIG. 19 and FIG. 20 constitute a flowchart that illustrates a flow of a process to display the pedal-based vehicle speed by the ECU fox setting the speed limit 120. Note that substantially the same steps as the steps in the process to display the pedal-based vehicle speed described by using FIG. 13 and FIG. 14 are assigned the same reference numbers, and their description is omitted here.

Steps S1901 to S1905 in that FIG. 19 and Steps S2001 to S2005 in FIG. 20 are different from FIG. 13 and FIG. 14. At Step S1901, the preceding vehicle speed calculation unit 1603 of the UI control unit 1600 determines whether there is a preceding vehicle. At Step S1901, if determining that there is no preceding vehicle, the determination unit 901 goes forward to Step S806 in FIG. 20. On the other hand, at Step S1901, if determining that there is a preceding vehicle, the determination unit 901 goes forward to Step S1902.

At Step S1902, the preceding vehicle speed calculation unit 1603 of the UI control unit 1600 calculates the current vehicle speed of the preceding vehicle. At Step S1903, the determination unit 1601 of the UI control unit 1600 determines whether the condition for calling attention to collision is satisfied. Note that a process to determine whether the condition for calling attention to collision is satisfied that is executed by the determination unit 1601 of the UI control unit 1600 will be described in detail later.

As a result of the process to determine whether the condition for calling attention to collision is satisfied, if determining that the condition for calling attention to collision is satisfied, the determination unit 901 goes forward to Step S1905 from Step S1904. At Step S1905, the message output unit 1602 of the UI control unit 1600 displays the message for calling attention to collision. After that, the determination unit 901 goes forward to Step S806 in FIG. 20.

On the other hand, at Step S1904, if determining that the condition for calling attention to collision is not satisfied, the determination unit 901 directly goes forward to Step S806 in FIG. 20.

At Step S2001 in FIG. 20, the determination unit 1601 of the UI control unit 1600 determines whether the message for calling attention to collision is currently displayed. If determining that the message for calling attention to collision is not displayed, the determination unit 1601 goes forward to Step S809. On the other hand, if determining that the message for calling attention to collision is currently displayed, the determination unit 1601 goes forward to Step S2002.

At Step S2002, the determination unit 1601 of the UI control unit 1600 determines whether the terminating condition for the message for calling attention to collision is satisfied. Note that a process to determine whether the terminating condition for the message for calling attention to collision is satisfied will be described in detail later.

As a result of determination at Step S2002, if determining that the terminating condition for the message for calling attention to collision is satisfied, the determination unit 1601 goes forward to Step S2004 from Step S2003. At Step S2004, the determination unit 1601 of the UI control unit 1600 deletes the candidate of the speed limit value to be switched from the switching candidate storage unit 124. Thus, displaying the message for calling attention to collision ends thereafter.

On the other hand, if determining that the terminating condition for the message for calling attention to collision is not satisfied, the determination unit 1601 goes forward to Step S2005. At Step S2005, the determination unit 1601 of the UI control unit 1600 issues a command to display the message for calling attention to collision. Thus, the message output unit 1602 of the UI control unit 1600 continues to display the message for calling attention to collision.

<3. Flow of Process to Determine Whether the Condition for Calling Attention to Collision is Satisfied>

Figure 21A:
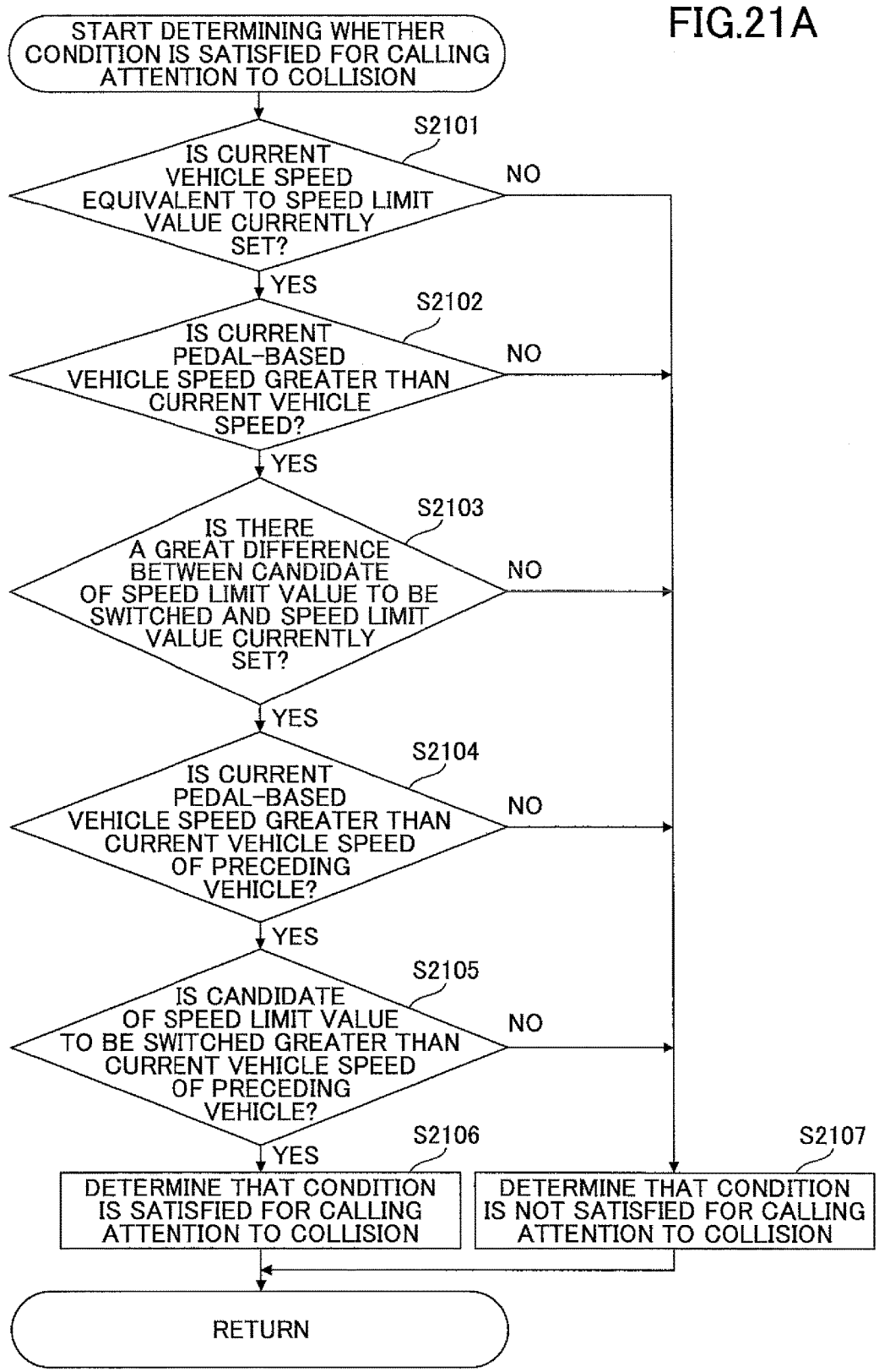
FIGS. 21A-21B are flowcharts that illustrate flows of a process to determine whether the condition for calling attention to collision is satisfied, and a process to determine whether the terminating condition for calling attention to collision is satisfied, respectively.

Next, the process to determine whether the condition for calling attention to collision is satisfied (Step S1903) in the process to display the pedal-based vehicle speed, will be described in detail. FIG. 21A is a flowchart that illustrates a flow of the process to determine whether the condition for calling attention to collision is satisfied.

At Step S2101, the determination unit 1601 of the UI control unit 1600 determines whether the current vehicle speed is equivalent to the speed limit value currently set. At Step S2101, if determining that they are not equivalent, the determination unit 1601 goes forward to Step S2107. On the other hand, at Step S2101, if determining that they are equivalent, the determination unit 1601 goes forward to Step S2102.

At Step S2102, the determination unit 1601 of the UI control unit 1600 determines whether the current pedal-based vehicle speed is greater than the current vehicle speed. At Step S2102, if determining that it is not greater, the determination unit 1601 goes forward to Step S2107. On the other hand, at Step S2102, if determining that it is greater, the determination unit 1601 goes forward to Step S2103.

At Step S2103, the determination unit 1601 of the UI control unit 1600 determines whether the difference between the candidate of the speed limit value to be switched and the speed limit value currently set is greater than or equal to the predetermined threshold. At Step S2103, if determining that it is less than the predetermined threshold, the determination unit 1601 goes forward to Step S2107. On the other hand, if determining that it is greater than or equal to the predetermined threshold, the determination unit 1601 goes forward to Step S2104.

At Step S2104, the determination unit 1601 of the UI control unit 1600 determines whether the current pedal-based vehicle speed is greater than the current vehicle speed of the preceding vehicle. At Step S2104, if determining that the current pedal-based vehicle speed is less than or equal to the current vehicle speed of the preceding vehicle, the determination unit 1601 goes forward to Step S2107. On the other hand, if determining that the current pedal-based vehicle speed is greater than the current vehicle speed of the preceding vehicle, the determination unit 1601 goes forward to Step S2105.

At Step S2105, the determination unit 1601 of the UI control unit 1600 determines whether the candidate of the speed limit value to be switched is greater than the current vehicle speed of the preceding vehicle. If determining that the candidate of the speed limit value to be switched is less than or equal to the current vehicle speed of the preceding vehicle, the determination unit 1601 goes forward to Step S2107. On the other hand, if determining that the candidate of the speed limit value to be switched is greater than the current vehicle speed of the preceding vehicle, the determination unit 1601 goes forward to Step S2106.

At Step S2106, the determination unit 1601 of the UI control unit 1600 determines that the condition for calling attention to collision is satisfied, and goes back to Step S1904 in FIG. 19. Also, at Step S2107, the determination unit 1601 of the UI control unit 1600 determines that the condition for calling attention to collision is not satisfied, and goes back to Step S1904 in FIG. 19.

<4. Details of Process to Determine Whether the Terminating Condition for Calling Attention to Collision is Satisfied>

Figure 21B:
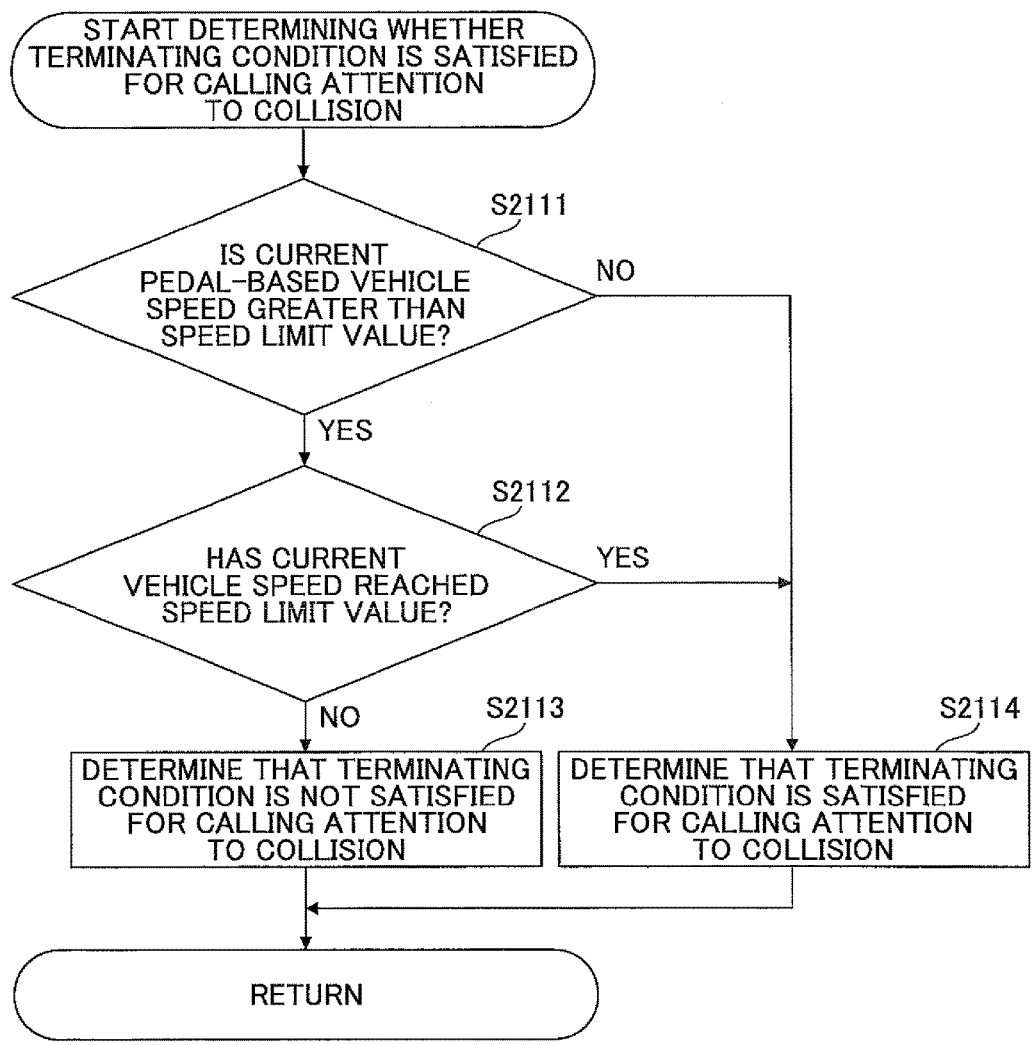

Next, the process to determine whether the terminating condition for calling attention to collision is satisfied (Step S2001) in the process to display the pedal-based vehicle speed, will be described in detail. FIG. 21B is a flowchart that illustrates a flow of the process to determine whether the terminating condition for calling attention to collision is satisfied.

At Step S2111, the determination unit 1601 of the UI control unit 1600 determines whether the current pedal-based vehicle speed is greater than the newly set speed limit value. At Step S2111, if determining that the current pedal-based vehicle speed is less than or equal to the newly set speed limit value, the determination unit 1601 goes forward to Step S2114. On the other hand, at Step S2111, if determining that the current pedal-based vehicle speed is greater than the newly set speed limit value, the determination unit 1601 goes forward to Step S2112.

At Step S2112, the determination unit 1601 of the UI control unit 1600 determines whether the current vehicle speed has reached the newly set speed limit value. At Step S2112, if determining that it has not, the determination unit 1601 goes forward to Step S2113. On the other hand, at Step S2112, if determining that it has, the determination unit 1601 goes forward to Step S2114.

At Step S2113, the determination unit 1601 of the UI control unit 1600 determines that the terminating condition for the message for calling attention to acceleration is not satisfied, and goes back to Step S2002 in FIG. 20. Also, at Step S2114, the determination unit 1601 of the UI control unit 1600 determines that the terminating condition for the message for calling attention to acceleration is satisfied, and goes back to Step S2002 in FIG. 20.

<5. Summary>

As clarified by the above description, the ECU for setting the speed limit 120 according to the embodiment is configured to determine whether there is a likelihood of a collision with the preceding vehicle due to the switching of the speed limit value, based on the condition for calling attention to collision, and to display the message for calling attention to collision if determining that there is a likelihood of a collision with the preceding vehicle when the condition for calling collision to collision is satisfied.

Thus, the driver can recognize that there is a likelihood that the vehicle accelerates steeply, and may collide with the preceding vehicle when the speed limit value is switched, due to the stepping amount on the accelerator pedal by himself/herself, before the switching.

Consequently, the driver can adjust the stepping amount on the accelerator pedal by himself/herself before the speed limit value is switched, and safe traveling of the vehicle can be maintained when the speed limit value is switched.

[Fourth Embodiment]

In the first embodiment, a configuration is described that calculates the pedal-based vehicle speed and displays it on the speed display screen. Also, in the second embodiment, a configuration is described that calculates the pedal-based vehicle speed and displays it on the speed display screen along with the message for calling attention to acceleration. Also, in the third embodiment, a configuration is described that calculates the pedal-based vehicle speed and displays it on the speed display screen along with the message for calling attention to collision.

However, it is obvious that these configurations may be arbitrarily combined, or just one of these configurations may be included. For example, one may consider a configuration that calculates the pedal-based vehicle speed and displays it on the speed display screen along with the message for calling attention to acceleration, and the message for calling attention to collision.

Also, one may consider a configuration that does not display the pedal-based vehicle speed, but displays the message for calling attention to acceleration, and the message for calling attention to collision. Alternatively, one may consider a configuration that does not display the pedal-based vehicle speed, but displays one of the message for calling attention to acceleration, and the message for calling attention to collision.

[Other Embodiments]

In the first to fourth embodiments, the timing to switch the upper limit speed value is a timing when the vehicle passes by the position where a road sign is installed. However, the timing to switch the upper limit speed value is not limited to that. For example, the upper limit speed value may be switched at a timing after a predetermined time has passed or the vehicle has traveled for a predetermined distance, since the vehicle had passed by the position where a road sign is installed.

Also, the second embodiment is configured to stop displaying the message for calling attention to acceleration when the terminating condition for the message for calling attention to acceleration is satisfied after the upper limit speed value has been switched. However, the timing to stop displaying the message for calling attention to acceleration is not limited to that. For example, displaying the message for calling attention to acceleration may be stopped at the timing when the upper limit speed value is switched. Specifically, Step S1403 may be executed after Step S807 in FIG. 14.

Similarly, the third embodiment is configured to stop displaying the message for calling attention to collision when the terminating condition for the message for calling attention to collision is satisfied after the upper limit speed value has been switched. However, the timing to stop displaying the message for calling attention to collision is not limited to that. For example, displaying the message for calling attention to collision may be stopped at the timing when the upper limit speed value is switched. Specifically, Step S2003 may be executed after Step S807 in FIG. 20.

Also, although displaying the speed limit value is not specifically mentioned in the first to fourth embodiments, the speed limit value currently set may be displayed on the speed display screen. Also, in the first to fourth embodiments, although the pedal-based vehicle speed (or the message for calling attention to acceleration and the message for calling attention to collision) has been described to be displayed on the speed display screen, it may be displayed elsewhere other than the speed display screen.

Also, the second to fourth embodiments are configured to display information derived from the pedal-based vehicle speed (the message for calling attention to acceleration and the message for calling attention to collision), in addition to displaying the pedal-based vehicle speed that corresponds to the stepping amount on the acceleration pedal 141, on the speed display screen. However, they may be configured to display information derived from the pedal-based vehicle speed (the message for calling attention to acceleration and the message for calling attention to collision), without displaying the pedal-based vehicle speed.

Also, although the second to fourth embodiments are configured to display the message for calling attention to acceleration and the message for calling attention to collision on the speed display screen, they may be configured to have, for example, a sound output unit to output the messages as audio data via the sound output unit. Note that if outputting audio data via the sound output unit, instead of the messages described above, predetermined alarm sounds may be output. In other words, any unit may be used as long as it is capable of indicating a likelihood of steep acceleration and/or collision to the driver.

Also, although the first to fourth embodiments are configured to detect a speed limit value on a road sign, based on image information obtained by the imaging device 111, the method of detecting the speed limit value is not limited to that, but a speed limit value may be detected any other detection methods. As one of the other detection methods, for example, a method may be considered that detects the speed limit value specified for a road for traveling depending on the positional information of the vehicle where the speed limit value has been stored in advance in the navigation device 112.

Also, in the first to fourth embodiments, the description assumes that the upper limit speed value is set to the speed limit value specified for a road for traveling. However, the upper limit speed value is not limited to be set to the speed limit value specified for a road for traveling, but, for example, may be set to a speed limit value specified by the driver.

Also, the first to fourth embodiments are configured to calculate the pedal-based vehicle speed that corresponds to the stepping amount on the acceleration pedal 141, and to display it on the speed display screen. However, the parameter displayed on the speed display screen is not limited to the pedal-based vehicle speed as long as it is a parameter that corresponds to the stepping amount on the acceleration pedal 141. As parameters that correspond to the stepping amount on the acceleration pedal 141 one may consider, for example, a parameter that represents an amount of operation by the driver such as the position of the acceleration pedal 141 and the pedaling force of the driver, and a parameter that represents the operational speed of the vehicle such as acceleration. Alternatively, one may consider a parameter that represents the operational speed of a mechanism of the vehicle, such as the rotational speed of the engine, the rotational speed of the motor for driving, and the rotational speed of the tire. Alternatively, one may consider a parameter that represents the amount of fuel consumption such as the amount of gasoline consumption and the amount of power consumption of the motor for driving, and a parameter that represents a state of the power source, such as the opening of the engine throttle and the engine torque.

Also, although the first embodiment is configured to display the pedal-based vehicle speed on the speed display screen 600 all the time, but the pedal-based vehicle speed may be displayed on the speed display screen 600, for example, only when the candidate of the speed limit value to be switched is stored in the switching candidate storage unit 124.

Also, the second to fourth embodiments are configured to determine that the vehicle is in a state where the vehicle speed is being limited to be less than or equal to the speed limit value if the current vehicle speed is equivalent to the speed limit value currently set, and the current pedal-based vehicle speed is greater than the current vehicle speed. However, they may be configured to determine that the vehicle is in a state where the vehicle speed is being limited to be less than or equal to the speed limit value, by other methods. As an example, a configuration will be described in which the vehicle speed is limited to be less than or equal to the speed limit value, by selecting a smaller driving force among an upper limit driving force calculated from an upper limit acceleration that is allowed based on the difference between the speed limit value and the current vehicle speed, and a driving force requested by the driver calculated from the stepping amount on the accelerator pedal. In this case, in a state where the upper limit driving force is selected, it is determined that the vehicle speed is limited to be less than or equal to the speed limit value. On the other hand, in a state where the upper limit driving force is selected, it is determined that the vehicle speed is not limited to be less than or equal to the speed limit value.

Note that the present invention is not limited to the configurations described in the embodiments and those combined with the other elements here. These can be changed within the scope of the present invention, and can be appropriately defined depending on usage.

The present application is based on and claims the benefit of priority of Japanese Priority Application No. 2015-106826, filed on May 26, 2015, the entire contents of which are hereby incorporated by reference.

The invention claimed is:

1. A vehicle speed limiter system, installed on a vehicle, comprising:
    a detection unit configured to detect a speed limit value of a road on which the vehicle is traveling;
    a setting unit configured to set the speed limit value detected by the detection unit;
    a limiter unit configured to limit the vehicle speed of the vehicle, based on the speed limit value set by the setting unit;
    an obtainment unit configured to obtain a stepping amount on an accelerator pedal of the vehicle;
    a calculation unit configured to calculate a parameter depending on the stepping amount, by using the stepping amount obtained by the obtainment unit in a state where the vehicle speed of the vehicle is being limited by the limiter unit; and
    a display unit configured to display information based on the parameter calculated by the calculation unit, when a speed limit value newly detected by the detection unit is greater than the speed limit value previously set by the setting unit, before the setting unit sets the speed limit value newly detected,
    wherein the calculation unit calculates the vehicle speed depending on the stepping amount, as the parameter, and
    wherein the display unit displays, as the information based on the parameter calculated by the calculation unit, information representing a change of behavior of the vehicle derived from the vehicle speed depending on the stepping amount, when the speed limit value newly detected is set.

2. The vehicle speed limiter system as claimed in claim 1, further comprising:
    a determination unit configured to determine whether the vehicle accelerates by setting the speed limit value newly detected, based on a current vehicle speed of the vehicle, the vehicle speed depending on the stepping amount, the speed limit value previously set by the setting unit, and the speed limit value newly detected,
    wherein the display unit displays the information representing the change of behavior of the vehicle derived based on a determination result by the determination unit.

3. The vehicle speed limiter system as claimed in claim 1, further comprising:
    a vehicle speed calculation unit configured to calculate a current vehicle speed of a preceding vehicle ahead of the vehicle; and
    a determination unit configured to determine whether there is a likelihood that the vehicle accelerates and the vehicle collides with the preceding vehicle, by setting the speed limit value newly detected, based on a current vehicle speed of the vehicle, the vehicle speed depending on the stepping amount, the speed limit value previously set by the setting unit, the speed limit value newly detected, and the current vehicle speed of the preceding vehicle, wherein the display unit displays the information representing the change of behavior of the vehicle derived based on a determination result by the determination unit.

* * * * *